(12) United States Patent
Satpathy et al.

(10) Patent No.: US 8,108,585 B2
(45) Date of Patent: Jan. 31, 2012

(54) CROSSBAR CIRCUITRY AND METHOD OF OPERATION OF SUCH CROSSBAR CIRCUITRY

(75) Inventors: Sudhir Kumar Satpathy, Ann Arbor, MI (US); David Theodore Blaauw, Ann Arbor, MI (US); Trevor Nigel Mudge, Ann Arbor, MI (US); Dennis Michael Sylvester, Ann Arbor, MI (US); Ronald George Dreslinski, Jr., Sterling Heights, MI (US)

(73) Assignee: The Regents of the Universtiy of Michigan, Ann Arbor, MI (US)

( * ) Notice: Subject to any disclaimer, the term of this patent is extended or adjusted under 35 U.S.C. 154(b) by 534 days.

(21) Appl. No.: 12/379,191

(22) Filed: Feb. 13, 2009

(65) Prior Publication Data

US 2010/0211719 A1    Aug. 19, 2010

(51) Int. Cl.
*G06F 13/00* (2006.01)
(52) U.S. Cl. .................................. 710/317; 340/2.1
(58) Field of Classification Search .......... 710/316–317; 340/14.4, 2.1; 370/380
See application file for complete search history.

(56) References Cited

U.S. PATENT DOCUMENTS

| 5,991,296 | A  | 11/1999 | Mu et al. |
| 6,356,111 | B1 | 3/2002  | Moss |
| 6,771,162 | B1 | 8/2004  | Moss |

OTHER PUBLICATIONS

Golshan et al., "A novel reduced swing CMOS BUS interface circuit for high speed low power VLSI systems", *IEEE Explore*, Jan. 22, 2009, pp. 351-354.

Chang et al., "A 50 Gb/s 32 × 32 CMOS Crossbar Chip using Asymmetric Serial Links", *Computer System Laboratory, Stanford University*, Apr. 1999, (4 pages).
Wu et al., "A 2Gb/s 256 * 256 CMOS Crossbar Switch Fabric Core Design using Pipelined MUX", *IEEE*, Jul. 2002, pp. II-568-II-571.
Wijetunga, "High-performance crossbar design for system-on-chip", *3rd IEEE International Workshop*, Jun. 2003, (6 pages).
Borgatti et al., "A Multi-Context 6.4Gb/s/Channel On-Chip Communication Network Using 0.18βm Flash-EEPROM Switches and Elastic Interconnects", *IEEE International Solid-State Circuits Conference*, Sep. 2003, (3 pages).
UK Search Report dated Apr. 16, 2010 for GB 1000172.5.

(Continued)

*Primary Examiner* — Clifford Knoll
(74) *Attorney, Agent, or Firm* — Nixon & Vanderhye P.C.

(57) ABSTRACT

Crossbar circuitry, and a method of operation of such crossbar circuitry, are provided. The crossbar circuitry has an array of data input paths and data output paths where the data output paths are transverse to the data input paths. At each intersection between a data input path and a data output path, a crossbar cell is provided that comprises a storage circuit programmable to store a routing value, and a transmission circuit. In a transmission mode of operation the transmission circuit is responsive to the routing value indicating that the data input path should be coupled to the data output path to detect the data input along the data input path, and to output an indication of that data on the data output path at the associated intersection. Control circuitry is used to issue control signals to the crossbar cells, and during a configuration mode of operation the control circuitry re-utilizes at least one of the data output paths to program the storage circuitry of one or more of the crossbar cells. Such a construction of crossbar circuitry provides a very regular design, with uniform delay across all paths, and which requires significantly less control lines than typical prior art crossbar designs. Such crossbar circuitry is readily scalable to form large crossbars.

27 Claims, 16 Drawing Sheets

OTHER PUBLICATIONS

Chi et al., "Decomposed Arbiters for Large Crossbars with Multi-Queue Input Buffers", IEEE International Conference on Computer Design, Oct. 14-16, 1991, pp. 233-238.

Delgado-Frias et al., "A VLSI Crossbar Switch with Wrapped Wave Front Arbitration", IEEE Transactions on Circuits and Systems, vol. 50, Issue 1, Jan. 2003, pp. 135-142.

Kavaldjiev et al., "A Virtual Channel Router for On-chip Networks", IEEE International SoC Conference, Sep. 12-15, 2004, pp. 289-293.

Shin et al, "Round-robin Arbiter Design and Generation", International Symposium on System Synthesis, 2002, pp. 243-248.

Plummer, "Asynchronous Arbiters", IEEE Transactions on Computers Archive, vol. 21, Issue 1, Jan. 1972), pp. 37-42.

Molnar et al., "Simple Circuits that Work for Complicated Reasons", International Symposium on Advanced Research in Asynchronous Circuits and Systems, 2000, 12 pages.

Josephs et al., "CMOS Design of the Tree Arbiter Element", IEEE Transactions on VLSI systems, vol. 4, Issue 4, Dec. 1996, pp. 472-476.

CROSSBAR CIRCUITRY AND METHOD OF OPERATION OF SUCH CROSSBAR CIRCUITRY

BACKGROUND OF THE INVENTION

1. Field of the Invention

The present invention relates to crossbar circuitry and a method of operation of such crossbar circuitry.

2. Description of the Prior Art

A crossbar circuit is a switch infrastructure for connecting multiple inputs to multiple outputs in a matrix manner. Accordingly, crossbar circuitry can be used to interconnect a plurality of source circuits and a plurality of destination circuits such that data input to the crossbar circuitry from any of the plurality of source circuits can be output to any of the plurality of destination circuits. Crossbar circuits can be used in a variety of implementations. For example, in a data processing system implementation, such crossbar circuitry can be used to interconnect a plurality of processing circuits used to perform data processing operations on data values with a plurality of storage structures used to store those data values, thereby allowing the data values from any storage structure to be routed to any processing circuit The storage structures can take a variety of forms, but in one example may comprise registers of a register bank.

Known techniques for producing crossbar circuits require a large area for the crossbar circuitry due to the components required to form the crossbar circuitry and the significant number of control lines required for routing control signals to those components, and also consume significant power. Further, their complexity tends to grow rapidly with size, making many of the known techniques impractical for use with crossbar circuits required to interconnect a large number of source circuits with a large number of destination circuits. Some known techniques are discussed below.

The article "A 50 Gb/s 32×32 CMOS Crossbar Chip using Asymmetric Serial Links" by K Chang et al, 1999 Symposium on VLSI Circuits, Digest of Technical Papers, Pages 19 to 22, and the article "A 2 Gb/s 256×256 CMOS Crossbar Switch Fabric Core Design using Pipelined MJX" by T Wu et al, IEEE International Symposium on Circuits and System, 2002, Pages 568 to 571, describe crossbar circuits using a hierarchical arrangement of multiplexers to enable the routing of data from any input source to any output destination. However, such MUX-based crossbar circuits are relatively large in size, and have a large power consumption. Further, they typically require a considerable number of control lines in order to control the various multiplexers. Such MUX-based designs are not typically scalable with an increase in the number of inputs and outputs to be supported, at least in part because it becomes increasingly difficult as the size increases to route the necessary control signals to the various multiplexers. Further, if the input data is multi-bit data routed over an input bus, the routing of the data paths themselves becomes very complex.

The article "A Novel Reduced Swing CMOS Bus Interface Circuit for High Speed Low Power VLSI Systems" by R Golshan et al, IEEE International Symposium on Circuits and System, Pages 351 to 354, 1994, describes an X-Y style crossbar circuit where the input paths pass in a horizontal direction and the output paths pass in a vertical direction. At the intersection between each input path and output path, a storage element in the form of a flip-flop circuit is provided whose output controls a transistor used to couple the input path to the output path. However, such a design requires a large number of control lines to program the various flip-flops in order to configure the crossbar circuit to perform the required routing. Further, the input data provided on an input data path is used to drive the output data on the relevant output data path. As the crossbar circuit becomes larger to accommodate larger numbers of inputs and outputs, the capacitance of the output data paths increases, and accordingly it is necessary to provide larger drive transistors on the inputs in order to overcome the increased capacitance. In addition, the coupling transistor driven by the flip-flop at the interconnection between a data input path and a data output path also needs to increase in size as the crossbar circuit increases in size. Further, it will typically be necessary to include one or more buffers in the data output paths as the crossbar circuitry increases in size. All of these factors give rise to significant problems in layout of the elements of the crossbar circuit and the associated control lines, particularly as the crossbar circuit increases in size to accommodate more inputs and outputs. Accordingly, this approach becomes complex and is not scalable.

The article "High-Performance Crossbar Design for System-On-Chip" by P Wijetunga, Proceedings of the Third IEEE International Workshop on System-On-Chip for Real-Time Applications, 2003, describes a crossbar design employing a pass-transistor chain as transmission circuitry to be located at each intersection between the data input paths and the data output paths. When the pass-transistor chain is required to couple the input data to the output data path, a current sensing circuit located on the output data path is used to detect the input data value. A significant disadvantage of this design is that it consumes large power due to the requirement for current sensing devices to be located on each output path. Further, a large number of control signals need routing within the crossbar circuitry, and indeed those control signals will dominate the routing requirements as the crossbar circuit increases in size to accommodate more inputs and outputs. Hence, again, this design is not readily scalable to larger designs of crossbar circuitry.

The article "A Multi-Context 6.4 Gb/s/Channel On-Chip Communication Network using 0.18 $\mu$m Flash-EEPROM Switches and Elastic Interconnects" by M Borgatti et al, ISSCC 2003, Session 26, Embedded and Digital Systems, Paper 26.5, describes a programmable crossbar implemented using a matrix of modified flash-EEPROM devices. However, as is clear from FIG. 26.5.6, the number of memory cells involved in routing a data input from a source device to a destination device depends on where those devices are connected into the crossbar, and accordingly the timing for signals passing through the crossbar is not deterministic. Further, a large number of control lines will be required to enable programming of the various flash-EEPROM cells, and a significant amount of time will be required to program those various flash-EEPROM cells. Any reconfiguration of the crossbar device will hence also take a significant time.

Accordingly, such a design of crossbar is complex, and will increase in complexity as more input devices and output devices need to be supported by the crossbar, due to the proliferation in control lines required. Further, since the timing of the crossbar is not deterministic, this will make the crossbar design inappropriate for certain implementations.

In summary, it will be appreciated from the above discussions that existing crossbar designs typically involve complex routing of control signals, with that complexity rapidly increasing as the size of the crossbar increases. Often the designs consume significant power consumption and lack scalability, due partly to the number of control lines required, and partly due to the need to increase the size of certain components provided within the crossbar as the size of the crossbar increases.

Accordingly, it would be desirable to provide an improved crossbar design that alleviates these problems.

SUMMARY OF THE INVENTION

Viewed from a first aspect, the present invention provides crossbar circuitry for interconnecting a plurality of source circuits and a plurality of destination circuits such that data input to the crossbar circuitry from any of said plurality of source circuits can be output to any of said plurality of destination circuits, the crossbar circuitry comprising: a plurality of data input paths passing through said crossbar circuitry, each data input path being connectable to one of said plurality of source circuits; a plurality of data output paths passing through said crossbar circuitry transverse to the plurality of data input paths, each data output path being connectable to one of said plurality of destination circuits; a crossbar cell associated with each intersection between one of said data input paths and one of said data output paths, each crossbar cell comprising: storage circuitry programmable to store a routing value, the routing value being programmed to a first value to indicate that data input along the data input path to the associated intersection is to be output on the data output path at the associated intersection, and the routing value being programmed to a second value to indicate that data input along the data input path to the associated intersection is not to be output on the data output path at the associated intersection; and transmission circuitry operable in a transmission mode of operation to be responsive to the routing value having said first value to detect the data input along the data input path and to output an indication of that data on the data output path at the associated intersection; and control circuitry for issuing control signals to the crossbar cells, during a configuration mode of operation the control circuitry re-utilising at least one of the data output paths to program the storage circuitry of one or more of the crossbar cells.

In accordance with the present invention, crossbar cells are associated with each intersection between a data input path and a data output path, with each crossbar cell comprising both storage circuitry to store a routing value and transmission circuitry operable in a transmission mode of operation to detect the data input along the data input path and to output an indication of that data on the data output path if the routing value indicates that the data input path should be connected to the data output path. Further, during a configuration mode of operation, control circuitry re-utilises at least one of the data output paths to program the storage circuitry of one or more of the crossbar cells. By re-utilising the data output paths during programming of the storage circuitry, this significantly reduces the number of control lines that need to be provided within the crossbar circuitry. This hence provides a very simple design which significantly improves flexibility when producing the wiring layout for the crossbar circuit. Due to the simple design, the design is readily scalable, and hence the crossbar circuitry can be readily utilised even where the number of source circuits and destination circuits to be connected to the crossbar circuitry is large.

Further, the regular layout that can be achieved when utilising the crossbar circuitry of the present invention provides a fixed latency for the transfer of data through the crossbar circuitry. In addition, the crossbar circuitry of the present invention readily supports the broadcast of input data, such that the data input from one source circuit can be broadcast to multiple destination circuit through the crossbar circuitry.

Whilst in one embodiment of the present invention, each of the data input paths and each of the data output paths may carry a single bit value, the crossbar circuitry can be used in situations where the data input paths and data output paths carry multi-bit data values, in which case the data input paths and data output paths may be formed by data buses. In one embodiment, each data output path comprises n data output lines for carrying an n-bit data value during said transmission mode of operation, and during the configuration mode of operation, the control circuitry is configured to program at the same time the storage circuitry of up to n crossbar cells associated with a selected data output path by using the n data output lines of that data output path.

The ability of the crossbar circuitry of embodiments of the present invention to readily accommodate multi-bit input data provided over an input bus, and to route that through the crossbar circuitry to a desired output bus, provides significant benefits when compared with a number of the prior art techniques. For example, the prior art techniques based on hierarchical structures of multiplexers become very complex when seeking to handle multi-bit inputs, since both the data path routing and the control signal routing becomes very complex.

In addition, in the above described embodiment of the present invention, the ability to use the n data output lines to program n crossbar cells during the configuration mode of operation significantly simplifies the circuit by avoiding the need for a significant number of control lines that would otherwise need to be provided separately within the crossbar circuitry.

The manner in which the control circuitry programs the storage circuitry of selected crossbar cells during the configuration mode of operation will depend on the type of storage structure provided within the storage circuitry. However, in one embodiment the crossbar circuitry further comprises: at least one word line routed to each storage circuitry for use in programming said storage circuitry during the configuration mode of operation; during the configuration mode of operation the control circuitry re-utilising the n data output lines of said selected data output path as n bit lines, each of said n bit lines being routed to a different one of n crossbar cells associated with said selected data output path to enable programming of said storage circuitry of said up to n crossbar cells. Hence, in such embodiments, a word line can be routed to multiple crossbar cells, whilst separate bit line signals are provided to those multiple crossbar cells utilising the multiple data output lines of the relevant data output path. If the number of crossbar cells associated with a particular data output path does not exceed n, then it will be appreciated that using such a technique, all of those crossbar cells can be programmed during a single programming operation.

However, the control circuitry may also be arranged to perform efficient programming of the crossbar cells in situations where there are more than n crossbar cells associated with a particular data output path. For example, in one embodiment, the number of crossbar cells associated with said selected data output path is mn, where m is an integer of 2 or more, and said at least one word line comprises a plurality of word lines, each word line being connected to a different n crossbar cells associated with said selected data output path. During the configuration mode of operation, said number of crossbar cells are programmed via m consecutive programming operations, during each programming operation the n data output lines acting as said n bit lines for the n crossbar cells being programmed by that programming operation.

Hence, by way of example, if the number of crossbar cells associated with the selected data output path is 2n, then all of those crossbar cells can have their storage circuits programmed by two consecutive programming operations, typically each programming operation taking a single clock cycle. It will be appreciated that such embodiments of the present invention provide a particularly fast and efficient mechanism for programming the storage circuits of the multiple crossbar cells, whilst avoiding the need for a large number of control lines by re-utilising the data output lines of the relevant data output path.

In one embodiment, during the configuration mode of operation at least one word line is driven by the control circuitry at a first logic level, and the routing value programmed into each storage circuitry is dependent on whether the associated output line acting as said bit line is driven by the control circuitry at the first logic level or a second logic level. The first logic level and second logic level may depend on the implementation, but in one embodiment the first logic level is a logic one level (as may be associated with a supply voltage level Vdd), and the second logic level is a logic zero level (as may be indicated by a zero voltage level). In one particular embodiment, if during the configuration mode of operation the bit line is driven at the first logic level, the routing value will be set to said second value indicating that the data input path should not be coupled to the data output path at the associated intersection. Conversely, if the bit line is driven at the second logic level, then the routing value will be programmed to said first value indicating that the data input path should be coupled to the data output path at the associated intersection. In one particular embodiment, the first value is a logic one value and the second value is a logic zero value.

In one embodiment, in the transmission mode of operation the word line is at a second logic level. In particular, in one embodiment the word line is tied to zero volts during the transmission mode of operation.

In one embodiment, the entire crossbar circuitry may be placed in the configuration mode of operation, such that the storage circuits of the crossbar cells associated with each of the data output paths are reprogammed at the same time. However, in another embodiment, a plurality of word lines are provided, thereby enabling certain crossbar cells to be in the configuration mode of operation whilst other crossbar cells are in the transmission mode of operation. In particular, in one such embodiment, the crossbar cells associated with one or more data output paths may be placed in the configuration mode of operation, whilst the crossbar cells associated one or more other data output paths may remain in the transmission mode of operation. This hence enables part of the crossbar circuitry to be reprogrammed, whilst data can still validly be transmitted through the rest of the crossbar circuitry, thereby significantly improving the flexibility of use of the crossbar circuitry.

In one embodiment, each storage circuitry may comprise a single storage element for storing a routing value used to determine whether the data input path should be connected to the data output path at the associated intersection. However, in an alternative embodiment, the storage circuitry comprises a plurality of storage elements, each being arranged to store a routing value for one of a plurality of configurations of the crossbar circuitry. This hence enables multiple configurations for the crossbar circuitry to be programmed during the configuration mode of operation, such that when the transmission mode of operation is subsequently entered, a desired configuration can readily be selected merely by selecting the appropriate storage element within said plurality of storage elements.

The plurality of storage elements within each storage circuitry may be programmed in a variety of ways. However, in one embodiment, each programming operation of the control circuitry during the configuration mode of operation causes a selected one of the storage elements to be programmed.

In one embodiment, during the transmission mode of operation the control circuitry is configured to generate a configuration control signal to identify, for each crossbar cell, which storage element of the storage circuitry is to be used to provide the routing value to the transmission circuitry. Hence, in such embodiments, the crossbar circuitry can utilise any of the programmed configurations without incurring any further reconfiguration penalty. Accordingly, such an approach can significantly improve the runtime speed of applications that require complicated shuffle operations by enabling the routing of the crossbar circuitry to be altered during runtime of the application merely by generation of an appropriate configuration control signal from the control circuitry. Further, power consumption is also reduced when compared with a crossbar having a single storage element in each storage circuit, since such a crossbar would need to be repeatedly reprogrammed to support such shuffle operations.

In one embodiment, the configuration control signal causes a one hot signal to be routed to the storage elements of each storage circuitry, thereby causing one of the storage elements to be selected. The configuration control signal issued by the control circuitry may itself be a one hot signal, or alternatively a one hot signal can be generated locally at each crossbar cell based on the configuration control signal provided by the control circuitry. This latter approach can reduce the size of the control path required to propagate the configuration signal to the various crossbar cells.

The number of the configuration control signals produced by the control circuitry may vary dependent on implementation. However, in one embodiment, the control circuitry issues said configuration control signal for each said data output path, whereby each configuration control signal controls the configuration of each crossbar cell associated with one said data output path. As a result, different configurations can be set for each column of crossbar cells associated with different data output paths.

The transmission circuitry of each crossbar cell can be constructed in a variety of ways. However, in one embodiment of the present invention, each data output path associated with a crossbar cell in the transmission mode of operation is precharged to a first logic level prior to data transfer, the transmission circuitry of each crossbar cell comprising: first and second switches connected in series between the data output path and a second logic level; in the transmission mode of operation the first switch being open or closed dependent on the routing value stored in the associated storage circuitry, and the second switch being open or closed dependent on the data input over the data input path. In one particular embodiment, the first logic level is the supply voltage level Vdd and the second logic level is ground. Hence, by such an arrangement, the data on the input path does not directly drive the data on the output path, and instead the data on the output path either remains at the first logic level, or is discharged towards the second logic level in the event that both the first and second switches are closed.

By such an arrangement of transmission circuitry, the transmission circuitry does not need to be altered irrespective of the size of the crossbar circuitry and hence the length of the data output path, and further the drive circuitry providing the input data over the input data path also does not need resizing as the crossbar circuitry is increased in size. Hence, as the crossbar circuitry is increased in size, the circuitry of each crossbar cell does not need to be changed and instead only the number of crossbar cell needs to increase. Thus, by using such a design, the delay of the crossbar circuitry grows linearly with size, making such a design of crossbar circuitry usable with very large crossbars (for example with 128×128 or 256× 256 inputs/outputs). In addition, the design is very regular and the delay across all routes through the crossbar circuitry is uniform.

In one embodiment, each said data input path comprises n data input lines for carrying an n-bit input data value during the transmission mode of operation, and each said data output path comprises n data output lines for carrying an n-bit data value during said transmission mode of operation, at least the second switch of the transmission circuitry being replicated for each output data line. Accordingly, the design of the transmission circuitry can readily accommodate data input paths and data output paths in the form of multi-bit buses, without any significant increase in the complexity of the crossbar circuitry.

In one embodiment of the present invention, in the transmission mode of operation the data output path is pulled to the second logic level if the routing value is said first value and said data input value is at said first logic level. Hence, if the routing value stored in the storage circuitry indicates that the data input path should be coupled to the data output path, and the data on the data input path is at a logic one level, then the data output path will be discharged towards the second logic level.

In one embodiment, each crossbar cell further comprises conditional discharge circuitry for turning off the first switch irrespective of the routing value whilst the associated data output path is being precharged to the first logic level, and for allowing the first switch to be controlled by the routing value following the precharging of the associated data output path to the first logic level. Accordingly, such conditional discharge circuitry isolates the data output lines from the inputs whilst they are being precharged, thereby reducing the power consumption of the precharge operation. Also, by such an arrangement the data input paths can be driven simultaneously with the precharge operation, due to the conditional discharge circuitry isolating the data output paths from the inputs at that time, thereby enabling an increased speed of operation.

Furthermore, by using the arrangement of transmission circuitry described above, it should be noted that all data output lines are precharged to the first logic level, and then either stay at the first logic level or transition to the second logic level dependent on the input value on the associated input line and the routing value. As a result, no situation arises where the voltages on two adjacent output lines are moving in opposite directions, thereby reducing capacitive coupling effects and thereby improving speed of operation.

The conditional discharge circuitry may be provided as part of the transmission circuitry. However, in one embodiment, the conditional discharge circuitry is incorporated within the storage circuitry of each crossbar cell.

In embodiments where the data output path is precharged prior to data transfer, and then selectively discharged dependent on the routing value and the data input value, power consumption of the crossbar circuitry can be reduced through the use of sense amplifier circuitry. In particular, in one embodiment, the crossbar circuitry further comprises sense amplifier circuitry to detect, during the transmission mode of operation, the data output on the data output path, thereby allowing detection of a transition towards the second logic level before the data output path has reached the second logic level. Since the detection of the transition occurs before the data output path has reached the second logic level, the power required to precharge the data output path back to the first voltage level is significantly reduced.

In embodiments where such precharging of the data output paths occurs, then further power savings can be obtained by suitable encoding of the input data prior to provision to the crossbar circuitry. In particular, in one embodiment, the crossbar circuitry further comprises: encode circuitry between each of said plurality of source circuits and said plurality of data input paths; decode circuitry between each of said plurality of data output paths and said plurality of destination circuits; the encode circuitry applying an encoding operation to encode input data provided by each source circuit into an encoded format that reduces the number of times the data output paths need to be pulled to the second logic level following their precharge to the first logic level, when compared to the number of times the data output paths would need to be pulled to the second logic level if the original input data were passed through the crossbar circuitry; the decode circuitry applying a corresponding decoding operation to identify the original input data provided by the source circuit from the encoded data output over the data output path.

In one particular embodiment, the encoding operation ensures that the encoded format produced from the input data is only a logic one value when the input data changes, and accordingly the data output path is only discharged when the input data changes. The decode circuitry then recreates the original input data from the encoded data output over the data output path.

The storage elements provided within the storage circuitry of each crossbar cell can take a variety of forms. However, in one embodiment, each storage circuitry comprises at least one SRAM memory cell for storing said routing value. SRAM memory cells are relatively quick to program, and consume relatively little power, thereby improving the speed of operation of the crossbar circuitry. In addition they are relatively small and can be laid out very compactly.

In one particular embodiment, each SRAM memory cell is a 6T SRAM memory cell.

Due to the regular design of the crossbar circuitry of embodiments of the present invention, and the manner in which the transmission circuits of each crossbar cell operate, the plurality of source circuits are connectable to either end of the plurality of data input paths, thereby significantly improving flexibility when designing the layout of the apparatus in which the crossbar circuitry and source circuits are provided. Similarly, the plurality of destination circuits are connectable to either end of the plurality of data output paths. The control circuitry may be coupled to one end of the plurality of data output paths, but this does not prevent destination circuits also being connected to that same end of the data output paths. In other embodiments, the control circuitry can be distributed across both ends of the plurality of data output paths.

In embodiments where multiple configurations are stored in the crossbar circuitry, the above freedom with regard to placement of the source and destination circuits can be exploited to provide a duplex implementation. In particular, in one embodiment, said plurality of source circuits are connected to a first end of said plurality of data input paths and an additional plurality of source circuits are connected to a second end of said plurality of data input paths, whilst said plurality of destination circuits are connected to a first end of said plurality of data output paths and an additional plurality of destination circuits are connected to a second end of said plurality of data output paths. Further, in a first state of the crossbar circuitry said plurality of source circuits are coupled to said plurality of destination circuits in accordance with a first of said plurality of configurations, and in a second state of the crossbar circuitry said additional plurality of source circuits are coupled to said additional plurality of destination circuits in accordance with a second of said plurality of configurations. Hence, by such an arrangement a single crossbar can be used to handle two sets of sources and destinations.

In one particular embodiment, the crossbar circuitry is clocked at a frequency at least twice that of said source and destination circuits and said additional source and additional destination circuits.

The crossbar circuitry of embodiments of the present invention may be utilised in a variety of systems. However, according to a second aspect of the present invention, a data processing apparatus is provided comprising: a plurality of registers for storing data values; a plurality of processing circuits for performing data processing operations in parallel on multiple of the data values stored in said plurality of registers; and crossbar circuitry in accordance with the first aspect of the present invention for routing the data value from any register of said plurality of registers to any processing circuit of said plurality of processing circuits.

The crossbar circuitry of embodiments of the present invention provides a particularly simple, scalable and power efficient mechanism for routing data values from any of the registers to any of the processing circuits.

Viewed from a third aspect, the present invention provides crossbar circuitry for interconnecting a plurality of source means and a plurality of destination means such that data input to the crossbar circuitry from any of said plurality of source means can be output to any of said plurality of destination means, the crossbar circuitry comprising: a plurality of data input path means passing through said crossbar circuitry, each data input path means for connecting to one of said plurality of source means; a plurality of data output path means passing through said crossbar circuitry transverse to the plurality of data input path means, each data output path means for connecting to one of said plurality of destination means; a crossbar cell means associated with each intersection between one of said data input path means and one of said data output path means, each crossbar cell means comprising: storage means programmable for storing a routing value, the routing value being programmed to a first value to indicate that data input along the data input path means to the associated intersection is to be output on the data output path means at the associated intersection, and the routing value being programmed to a second value to indicate that data input along the data input path means to the associated intersection is not to be output on the data output path means at the associated intersection; and transmission means, responsive to the routing value having said first value in a transmission mode of operation, for detecting the data input along the data input path means and for outputting an indication of that data on the data output path means at the associated intersection; and control means for issuing control signals to each crossbar cell means, during a configuration mode of operation the control means for re-utilising at least one of the data output path means to program the storage means of one or more of the crossbar cell means.

Viewed from a fourth aspect, the present invention provides a method of operating crossbar circuitry to interconnect a plurality of source circuits and a plurality of destination circuits such that data input to the crossbar circuitry from any of said plurality of source circuits can be output to any of said plurality of destination circuits, the crossbar circuitry having a plurality of data input paths passing through said crossbar circuitry, each data input path being connectable to one of said plurality of source circuits, and a plurality of data output paths passing through said crossbar circuitry transverse to the plurality of data input paths, each data output path being connectable to one of said plurality of destination circuits, the method comprising: employing a crossbar cell in association with each intersection between one of said data input paths and one of said data output paths; programming a routing value in each crossbar cell, the routing value being programmed to a first value to indicate that data input along the data input path to the associated intersection is to be output on the data output path at the associated intersection, and the routing value being programmed to a second value to indicate that data input along the data input path to the associated intersection is not to be output on the data output path at the associated intersection; in a transmission mode of operation, causing the crossbar cell to be responsive to the routing value having said first value to detect the data input along the data input path and to output an indication of that data on the data output path at the associated intersection; and issuing control signals to the crossbar cells, during a configuration mode of operation the control circuitry re-utilising at least one of the data output paths to program the storage circuitry of one or more of the crossbar cells.

BRIEF DESCRIPTION OF THE DRAWINGS

The present invention will be described further, by way of example only, with reference to embodiments thereof as illustrated in the accompanying drawings, in which.

DESCRIPTION OF EMBODIMENTS

Figure 1:
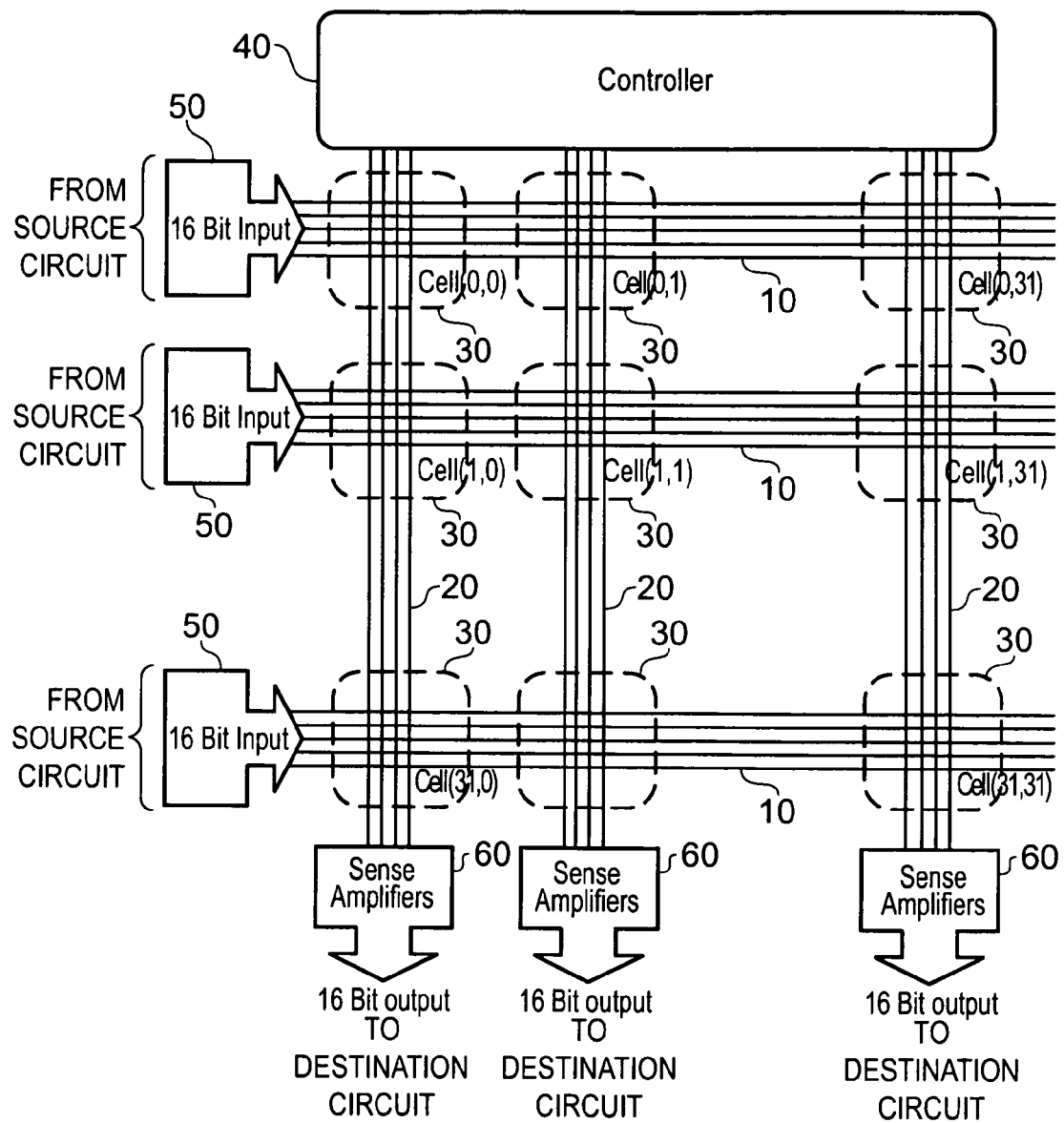
FIG. 1 is a block diagram of crossbar circuitry in accordance with one embodiment of the present invention.

FIG. 1 is a diagram schematically illustrating the crossbar circuitry in accordance with one embodiment of the present invention. The crossbar circuitry includes a plurality of data input paths 10 running in a first direction through the crossbar circuitry, and a plurality of data output paths 20 running in a second direction transverse to the first direction. Whilst both the data input paths and data output paths may route single bit values, in the embodiment of FIG. 1 both of these paths are formed by multi-bit buses, and accordingly the data input path comprises a plurality of data input lines and the data output path comprises a plurality of data output lines.

At the intersection between each data input path and data output path, a crossbar cell 30 is provided, and each crossbar cell is controlled by the controller 40 to identify whether the data input 50 received by that crossbar cell on the associated data input path should be routed out on the associated data output path. Each crossbar cell includes at least one storage element for storing the on/off status of each crossbar cell, such that if the crossbar cell is in the on state, then it will route input data received on the data input path to the data output path, and if the cell is in the off state, the input data will merely be passed through the cell without being routed on to the associated data output path.

Each data input path is coupled to an associated source circuit from which input data may be received, and each data output path is coupled to an associated destination circuit arranged to receive the output data provided on that data output path.

The crossbar circuitry may operate in either a transmission mode of operation or a configuration mode of operation. In the transmission mode of operation, data received over the data input paths is routed through the crossbar circuitry to the appropriate data output paths dependent on the on/off status of each crossbar cell. In the configuration mode of operation, the on/off status of each cell is programmed by the controller 40, and in accordance with embodiments of the present invention, the individual data output lines of the data output paths are used in the programming operation of the crossbar cells, as will be discussed in more detail later. By such an approach, a significant reduction in the number of control lines required within the crossbar circuitry is achieved, thereby significantly simplifying the design.

Figure 2:
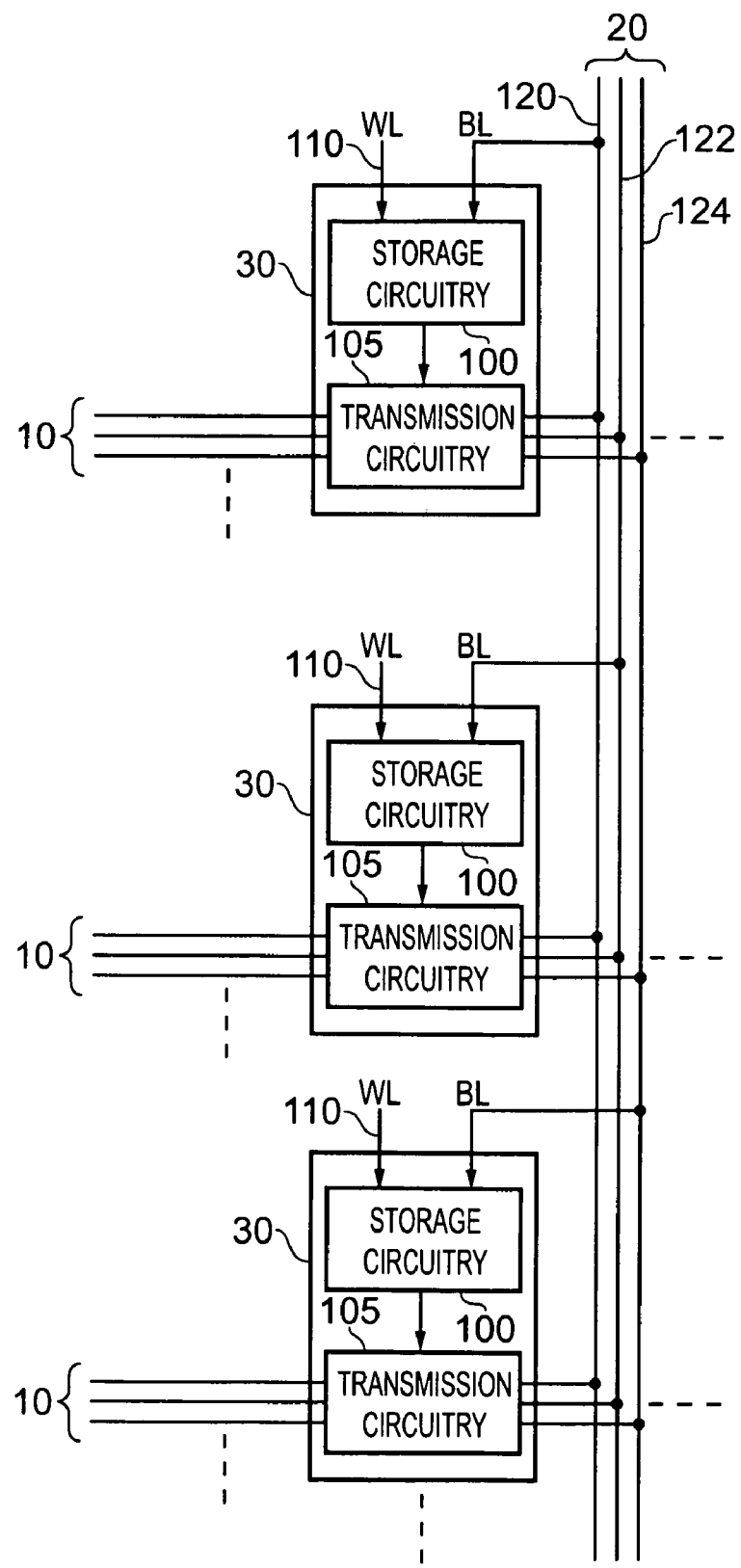
FIG. 2 illustrates the basic structure of each crossbar cell within the crossbar circuitry, and the manner in which individual data output lines of a data output path are re-used as bit lines for programming of the storage circuitry within each crossbar cell in accordance with one embodiment of the present invention.

FIG. 2 schematically illustrates the basic components of each crossbar cell in accordance with embodiments of the present invention. Each crossbar cell 30 includes storage circuitry 100 that is programmable to store a routing value (the earlier-mentioned on/off status). During the data transmission mode of operation, this routing value is provided from the storage circuitry 100 to transmission circuitry 105. If the routing value indicates the on status, then the transmission circuitry 105 detects the input data received over data input path 10, and routes that data out on the data output path 20. If the routing value indicates the off status, then the data is propagated on to the next crossbar cell along the data input path without being connected to the data output path.

As also shown in FIG. 2, the data output path 20 consists of a plurality of data output lines 120, 122, 124, and during the configuration mode of operation individual data output lines are used as bit lines for the storage circuitry 100. Hence, as shown in FIG. 2, the data output line 120 forms the bit line for a first crossbar cell, the data output line 122 forms the bit line for a second crossbar cell, the data output line 124 forms the bit line for a third crossbar cell, etc. A word line 110 is also provided from the controller 40 and the word line in combination with the bit line is used to program the storage circuitry 100. As will be seen from FIG. 2, if the data output path 20 contains n data output lines, then n crossbar cells in a particular column of the crossbar circuit can be programmed via a single programming operation.

In the particular example embodiment in FIG. 1, where the crossbar circuitry is a 32×32 array of crossbar cells, and the data input paths and data output paths contain 16 data lines, then one word line will be fed to 16 of the crossbar cells in a particular column and another word line will be fed to the remaining 16 crossbar cells in that column, and the entire column of crossbar cells can be programmed by two programming operations, typically each programming operation taking one clock cycle.

Word lines may be provided for each separate column, or alternatively the same word line(s) may be used across all columns. If the same word line is used across all columns, then all columns will be placed in the configuration mode of operation at the same time, and up to n crossbar cells in each column will be programmed simultaneously. However, by providing separate word lines for each column, this provides additional flexibility, since certain columns can be placed in the configuration mode of operation whilst other columns are in the transmission mode of operation.

Figure 3:
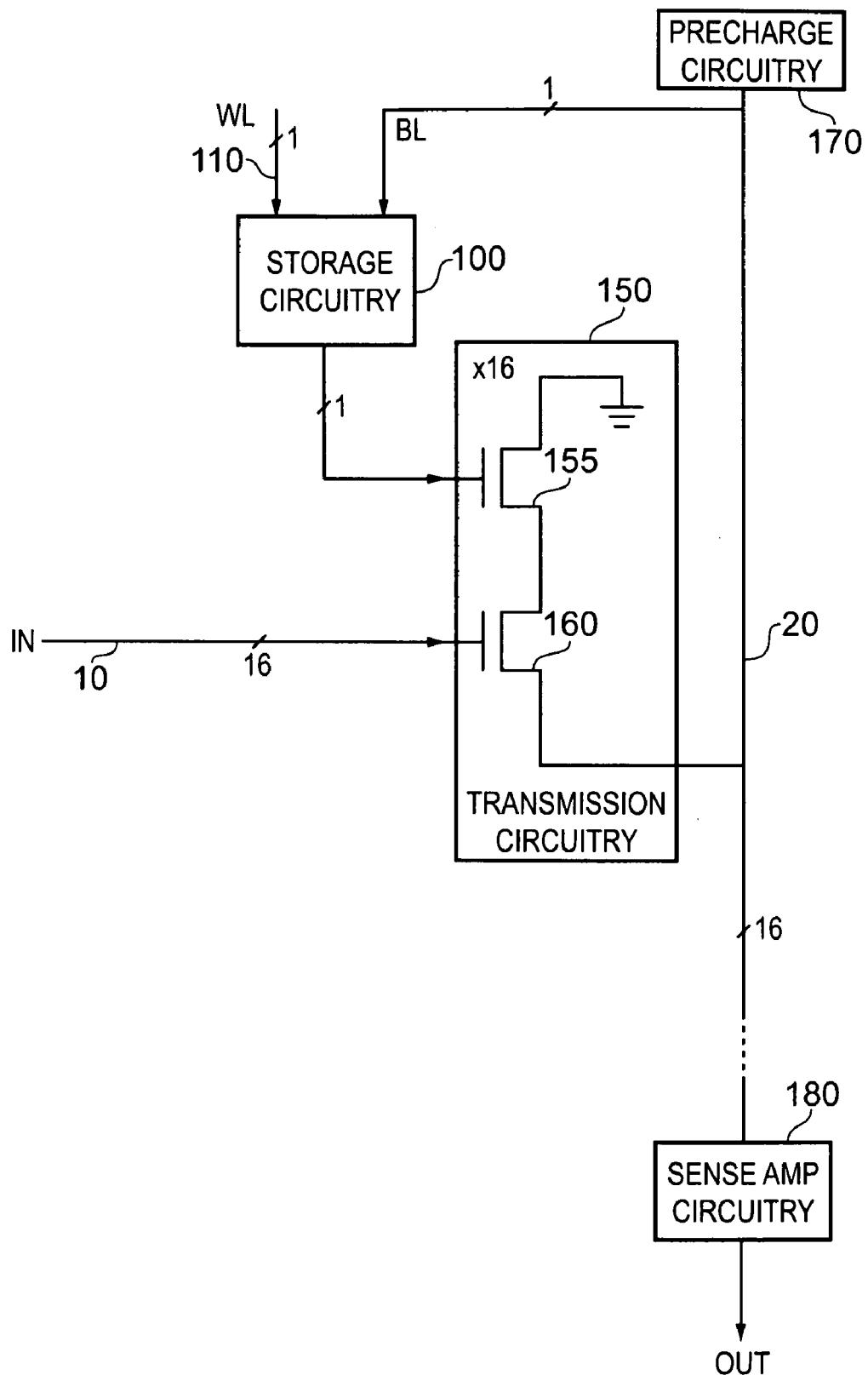
FIG. 3 illustrates in more detail the arrangement of the transmission circuitry of FIG. 2 in accordance with one embodiment of the present invention.

FIG. 3 illustrates the structure of each crossbar cell in accordance with one embodiment of the present invention. In this embodiment, the transmission circuitry includes a pair of transistors 155, 160 for each bit of the data input path. Hence, considering the example of FIG. 1 where the data input path is a 16-bit wide bus, the transistor pairs 155, 160 will be repeated sixteen times.

In the embodiment shown in FIG. 3, precharge circuitry 170 is provided for precharging the data output lines of the data output path 20 prior to a transfer of data occurring through the crossbar circuitry. Further, in the embodiment shown in FIG. 3, sense amp circuitry 180 is used for sensing the output data.

In a configuration mode of operation, the word line is raised to a logic one (Vdd) level, and each data output line forming a bit line is held at a logic one (Vdd) level to write a logic zero value into the associated storage circuitry, or is held at a logic zero (ground) level in order to write a logic one value into the associated storage circuitry. Typically, only one enabled storage circuit in a particular column of the crossbar will store a logic one value. Hence, for all except one storage circuit in a column, logic zero values will be stored therein, and hence most of the time logic 0 values will be written into the storage circuits. Due to the precharging scheme, most of the time the bit lines will be at the Vdd logic level. Hence, by arranging that a bit line held at the Vdd level writes a logic zero value into a storage circuit, this avoids the need to pull any of those bit lines down towards ground when writing logic zero values. Only for the relatively few storage circuits where a logic 1 value needs to be stored will the relevant bit lines need to be pulled to ground. Accordingly this writing scheme saves significant power consumption.

In the transmission mode of operation, the word line is tied to ground, whilst the data output lines are precharged to a logic one (Vdd) level by the precharge circuitry 170. Simultaneously, the input data can be provided from the source circuits to the data input paths of the crossbar circuit. Thereafter, the data output lines are conditional discharged. As can be seen from FIG. 3, a data output line discharges only if the storage circuitry is in the on state (i.e. stores a logic one value thereby turning on transistor 155) and the corresponding input data bit is high, thereby turning on transistor 160. In this state, it should be noted that the data input does not need to drive the data output line 20, since instead the connection to ground discharges the data output line. This is beneficial, since the data output lines will be long, particularly in large crossbar circuits, and accordingly will have significant capacitance. By selectively discharging these data lines to ground through the transistors 155, 160 when in the on state, this makes the design very scalable, since neither the size of the transmission circuitry, nor the driver circuitry used to provide the input data on the input data path 10, need to increase in size as the crossbar circuitry increases in size. Further, no additional hardware or sizing is required to support multi-casting, where a single input data value is broadcast to multiple output paths.

As also shown in FIG. 3, following the conditional discharge operation, a sensing phase takes place via the sense amp circuitry 180, where a small swing in the bit line voltage is amplified by the sense amplifier circuitry to a full rail swing. The sense amp circuitry 180 can be constructed in a variety of ways, but in one embodiment is formed of a single ended sense amplifier which compares the voltage on each data output line with a reference voltage in order to detect the data output value. In particular, if a data input value on a data input line of the data input path is a logic one value, then this will be detected at the relevant data output path by the sense amp circuitry detecting the voltage on the corresponding data output line dropping below the reference voltage. Conversely, if the data input value is a logic zero value, the transistor 160 will not turn on, and the corresponding data output line will not discharge. Hence, by the end of the sensing phase, the sense amp circuitry will not have detected a drop in the voltage below the reference voltage, and will accordingly determine that the data input value was a logic zero value.

Figure 4:
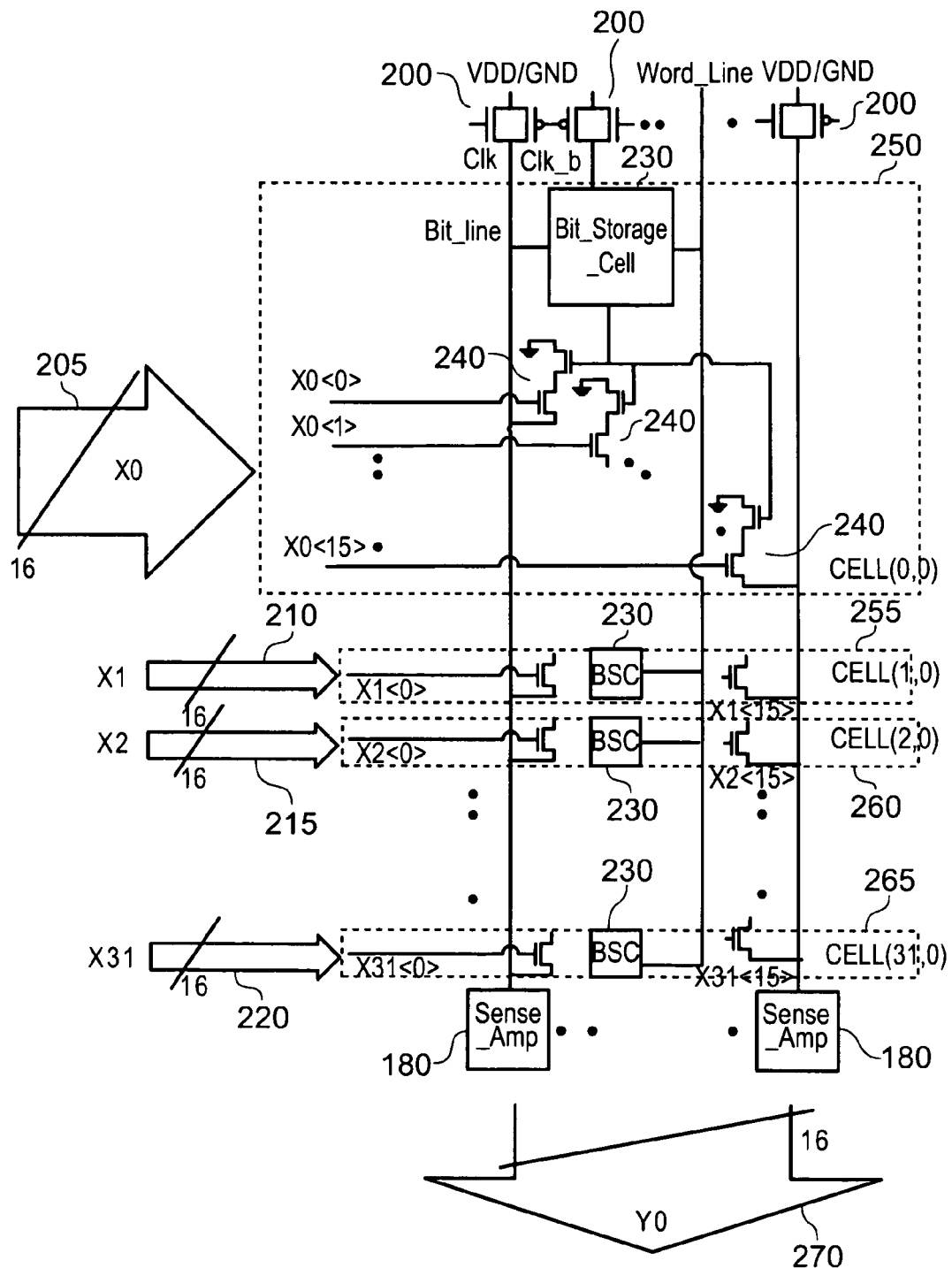
FIG. 4 illustrates the repeated sequence of transistor pairs used to form the transmission circuitry in each crossbar cell in accordance with one embodiment of the present invention.

FIG. 4 is a diagram illustrating a column of crossbar cells 250, 255, 260, 265 within the crossbar circuitry in accordance with one embodiment of the present invention, along with the associated data input paths 205, 210, 215, 220 and the common data output path 270. Cell 250 illustrates the storage circuitry (referred to in FIG. 4 as the bit storage cell 230) and the associated transmission circuitry. In particular, as shown in FIG. 4, for each bit of the 16 bit input data, the transmission circuitry provides a pair of transistors 240, each transistor pair 240 consisting of the transistors 155, 160 shown in FIG. 3. As also shown in FIG. 4, the precharge circuitry 170 consists of a pair of transistors 200 for each data output line. Each precharge transistor pair 200 consists of an NMOS transistor and PMOS transistor back to back, such that when the clock signal goes high, the data lines are precharged, and when the clock signal goes low the precharge operation ends. During the data transmission mode of operation, these precharge transistor pairs 200 are always connected to Vdd, so as to precharge the data output lines to Vdd. However, in the configuration mode of operation, these transistor pairs 200 can selectively be connected to either Vdd or ground to cause the individual data output lines to be driven to the required logic level in order to program the various bit storage cells 230.

Figure 5:
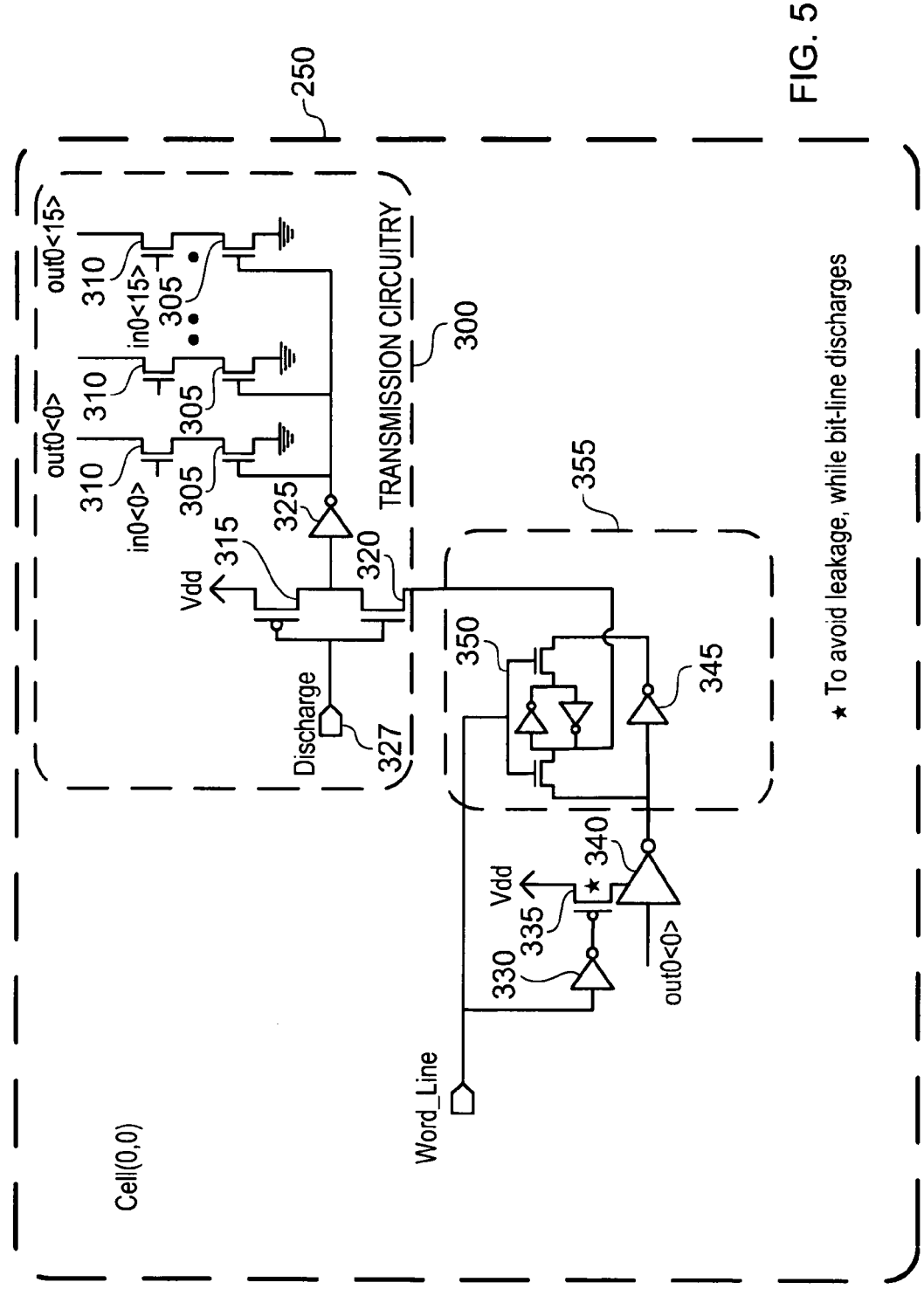
FIG. 5 illustrates the components provided within each crossbar cell in accordance with one embodiment of the present invention.

FIG. 5 is a diagram illustrating the components provided within each crossbar cell in accordance with one embodiment of the present invention. The transmission circuitry 300 includes transistor pairs 305, 310 for each data output line, each transistor pair 305, 310 corresponding to the transistor pair 155, 160 shown in FIG. 3. Conditional discharge circuitry is also provided in the form of the transistors 315, 320 and the inverter 325. A discharge signal is received at node 327 which is set to a logic zero value when the clock signal is at a logic one level and is set to a logic one value for at least part of the time when the clock signal is at a logic zero level. Hence, when the discharge signal is at a logic zero value, the transistor 315 will turn on and the transistor 320 will turn off. The transistor 320 turning off will isolate the transmission circuitry 300 from the output of the storage element 355 within the storage circuitry. Further, the transistor 315 turning on will cause a logic zero value to be output by the inverter 325, therefore turning the transistors 305 off. This hence isolates each of the data output lines from ground whilst they are being precharged to Vdd, thereby reducing power consumed by the precharge process.

When the discharge signal then transitions to a logic one value (after the end of the precharge phase) the transistor 315 will turn off and the transistor 320 will turn on. As a result, the transmission circuitry 300 will then be connected to the output from the storage element 355 allowing the transistors 305 to be turned on or off in dependence on the data value stored in the storage element. In one embodiment the time for which the discharge signal is held at the logic one value can be tuned having regards to the threshold of the sense amplifier circuitry, so that the data output lines that do discharge only do so to the extent necessary to be detected by the sense amplifier circuitry, thereby saving power.

The storage element 355 comprises a 6T SRAM cell 350 and an inverter 345 used to create the bit line and bit line_b inputs used at opposing sides of the SRAM cell 350.

As mentioned earlier, during the configuration mode of operation when the storage element is being programmed, the word line is pulled to Vdd, and accordingly the inverter 330 causes the transistor 335 to turn on powering the inverter circuit 340, and thereby allowing the value of the bit line to be used to program the storage element. Conversely, during the data transmission mode of operation, the word line is at a logic zero level, and accordingly the transistor 335 is turned off. As a result, the inverter circuit 340 is not turned on, and the bit line is isolated from the storage element. This avoids leakage occurring from the storage element whilst the bit line discharges during the data transmission mode of operation.

Figure 6:
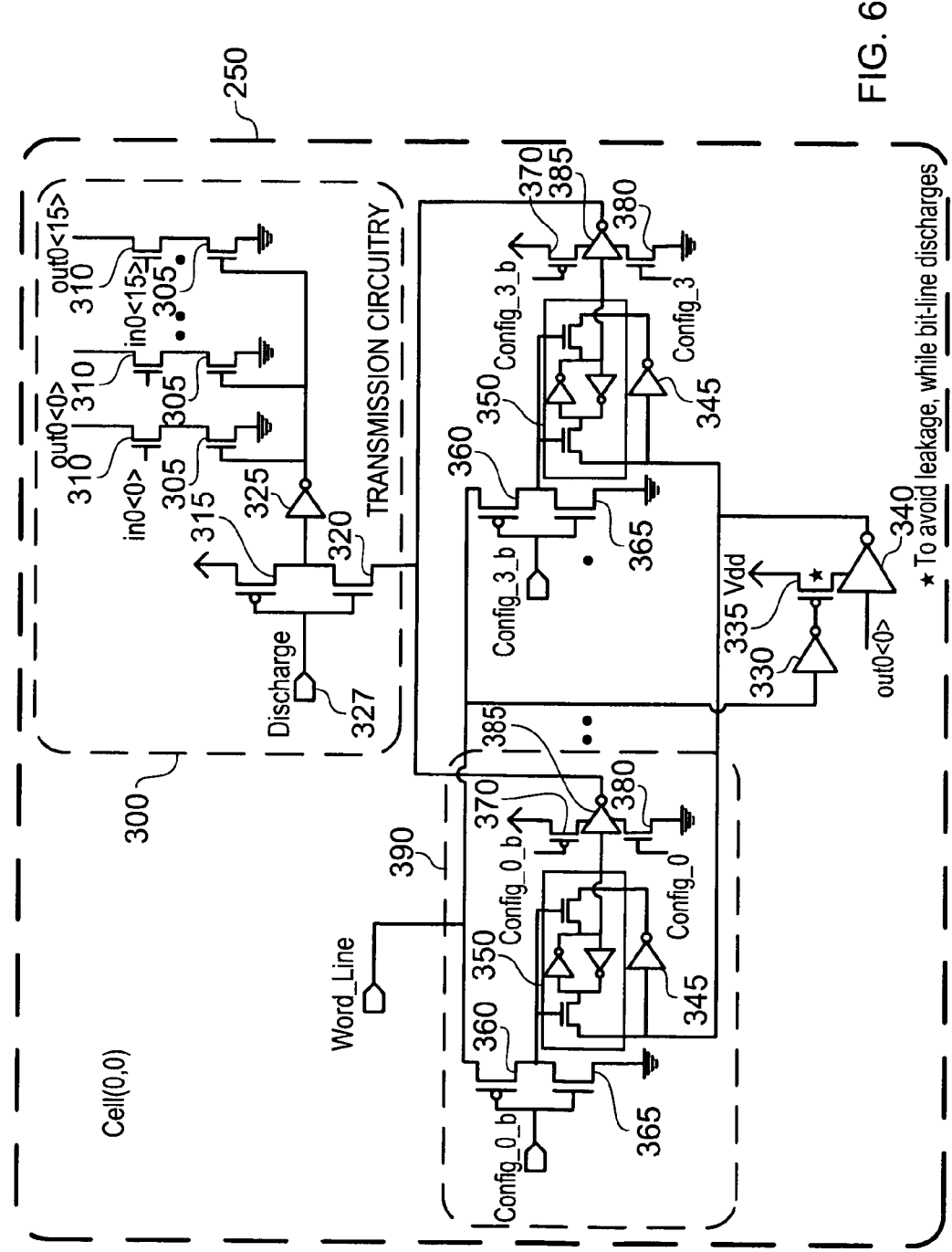
FIG. 6 illustrates the components provided within each crossbar cell in accordance with an alternative embodiment of the present invention.

FIG. 6 illustrates the structure of a crossbar cell in accordance with an alternative embodiment of the present invention. As can be seen by comparing FIG. 6 with FIG. 5, the transmission circuitry 300 is unchanged. However, in the embodiment illustrated in FIG. 6, four separate storage elements are provided for storing four configurations for the crossbar cell. Hence, each storage element 390 includes a 6T SRAM cell 350 and associated inverter 345 as in FIG. 5, but includes additional configuration selection circuitry. In particular, the transistors 360 and 365 are used during the configuration mode of operation to selectively couple the high logic level word line to a selected one of the SRAM cells 350. A configuration signal "config" is generated as a one hot signal such that one bit of that signal is used by each storage element 390. Only one bit will be set high, and for the storage element 390 associated with that bit, due to the inverse of the configuration signal being provided to the gates of the transistors 360, 365, the transistor 360 will turn on and cause the word line to be coupled to the memory cell, thereby allowing that memory cell to be programmed.

The one hot configuration signal may be generated by the controller 40, or alternatively a configuration control signal may be issued by the controller which is used locally at each crossbar cell to generate the one hot configuration signal. This latter approach will reduce the size of the control lines required from the controller to each crossbar cell.

To program each of the four separate storage elements will require four separate programming operations. However, once the various configurations have been programmed into the crossbar cell, switching between the various configurations can occur without any further time penalty. In particular, the config signal is also provided to the gates of transistors 370, 380. If the config signal of a particular storage element 390 is set high during the transmission mode of operation, this will cause the associated transistors 370, 380 to turn on, thereby powering the inverter 385 to provide a signal to the transmission circuitry indicative of the routing value stored in the memory cell 350. For all of the other storage elements, the transistors 370, 380 will be turned off, and accordingly the inverter 385 will not provide any output.

The isolation circuitry formed by the components 330, 335 and 340 (discussed earlier with reference to FIG. 5) is shared between all of the storage elements 390.

By using the embodiment of FIG. 6, it is possible to store multiple configurations within each crossbar cell, and then very quickly switch between those various configurations without further programming overhead. Such an approach can boost the runtime of applications that require complicated shuffle operations on the input data, by reducing the number of accesses to the storage containing the input data values.

Figure 7:
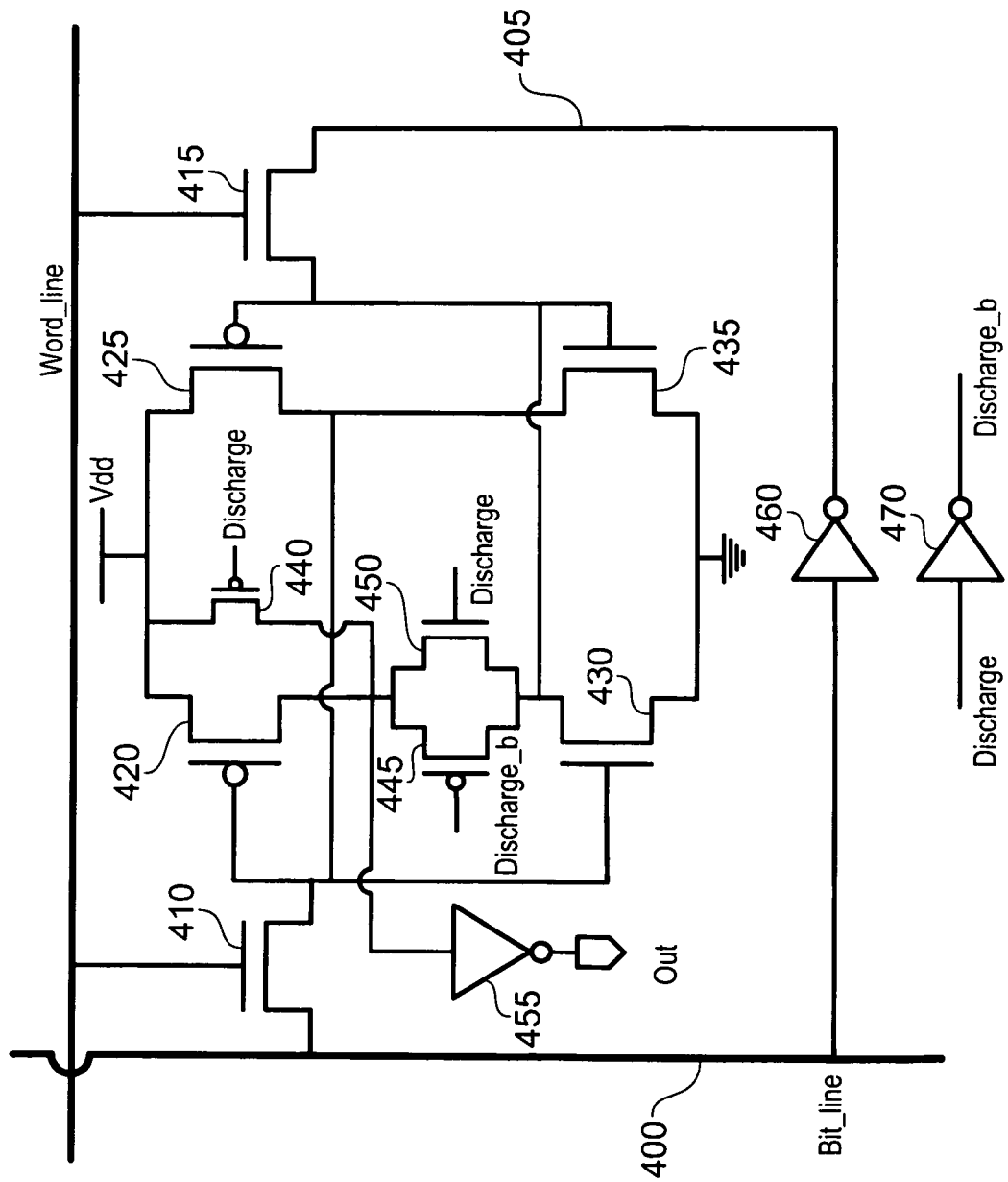
FIG. 7 illustrates how conditional discharge circuitry can be incorporated within the storage element of each crossbar cell in accordance with one embodiment of the present invention.

When using an embodiment of crossbar cell including only a single storage element, it is possible to incorporate the functionality of the conditional discharge circuitry (represented by transistors 315, 320 and inverter 325 in FIG. 5) within the storage element itself, as will be discussed in more detail with reference to FIG. 7. As shown in FIG. 7, the two PMOS transistors 420, 425 and the two NMOS transistors 430, 435 form the cross coupled inverters of the SRAM memory cell, and the NMOS transistors 410, 415 form the pass gate transistors of the SRAM memory cell, for coupling the memory cell to the bit lines 400, 405 in dependence on the value of the word line (the signal on bit line 405 being the inverse of the signal on bit line 400 via the use of inverter 460).

In addition, the transistors 440, 445, 450 are provided. As discussed earlier with reference to FIG. 5, when the discharge signal is at a low voltage level, a logic zero value is input to the transistors 305 so that those transistors are turned off irrespective of the routing value stored in the memory cell, thereby improving the efficiency of the precharge operation occurring during this period. As will be appreciated from FIG. 7, when the discharge signal is low, transistors 445 and 450 will be turned off (the discharge_b signal being at a high logic level due to inverter 470), and transistor 440 will be turned on, thereby causing Vdd to be routed to the inverter 455, and hence a logic zero value to be output. This logic zero value will then be input to the transistors 305 in order to turn them off. Accordingly, this removes the need for the components 315, 320 and 325 shown in FIG. 5.

Conversely, when the discharge signal is high, indicating that the precharge phase has ended and that data transmission is to occur, the transistor 440 will be turned off and both of the transistors 445 and 450 will be turned on, so that the 6T SRAM cell takes its normal configuration and an indication of the value stored in the SRAM cell is output by the inverter 455.

Figure 8A:
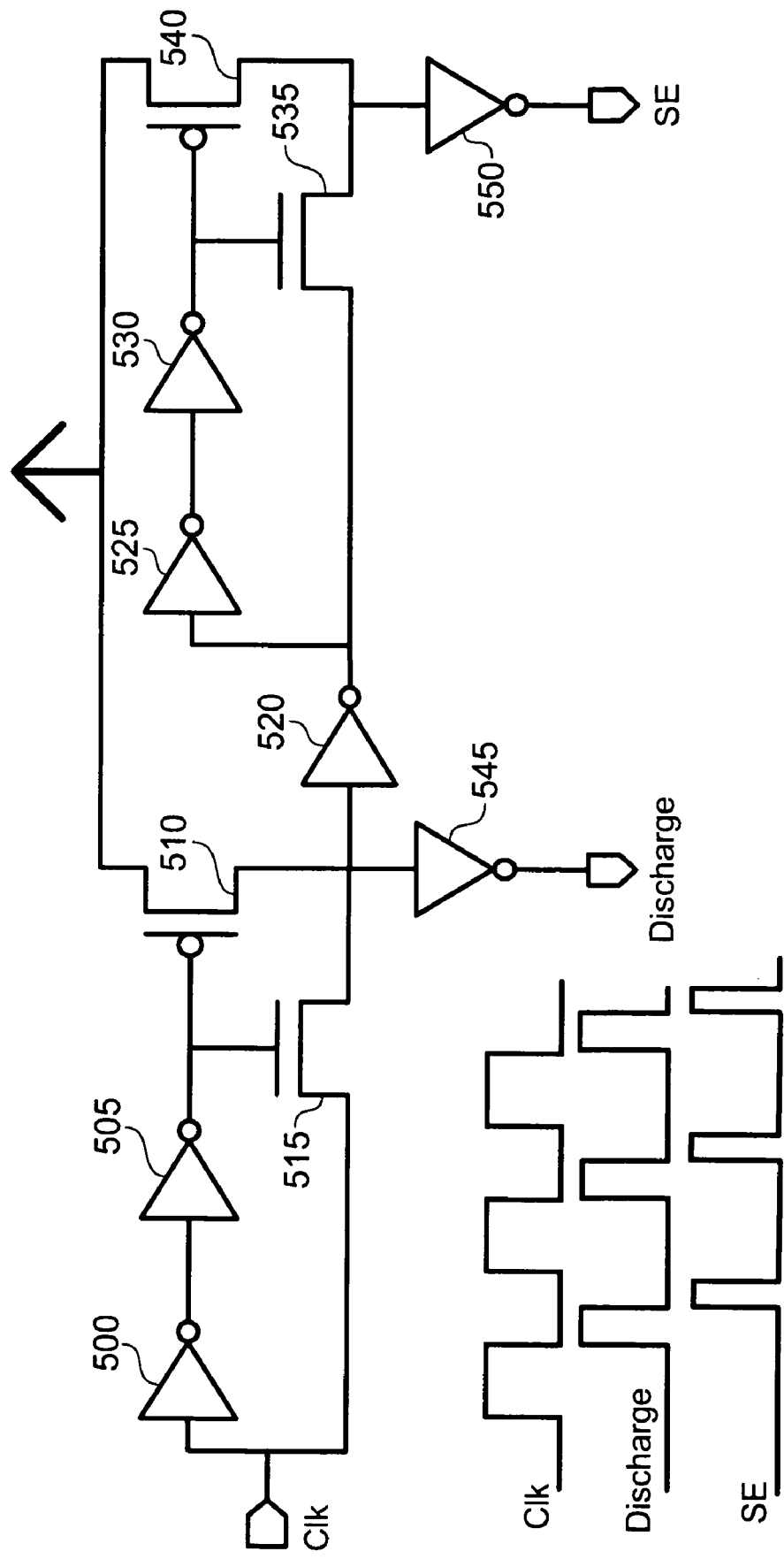
FIG. 8A illustrates pulse generation circuitry provided within the controller of the crossbar circuitry in accordance with one embodiment in order to generate the signals required to conditionally discharge the data output lines and to activate the sense amp circuitry.
Figure 8B:
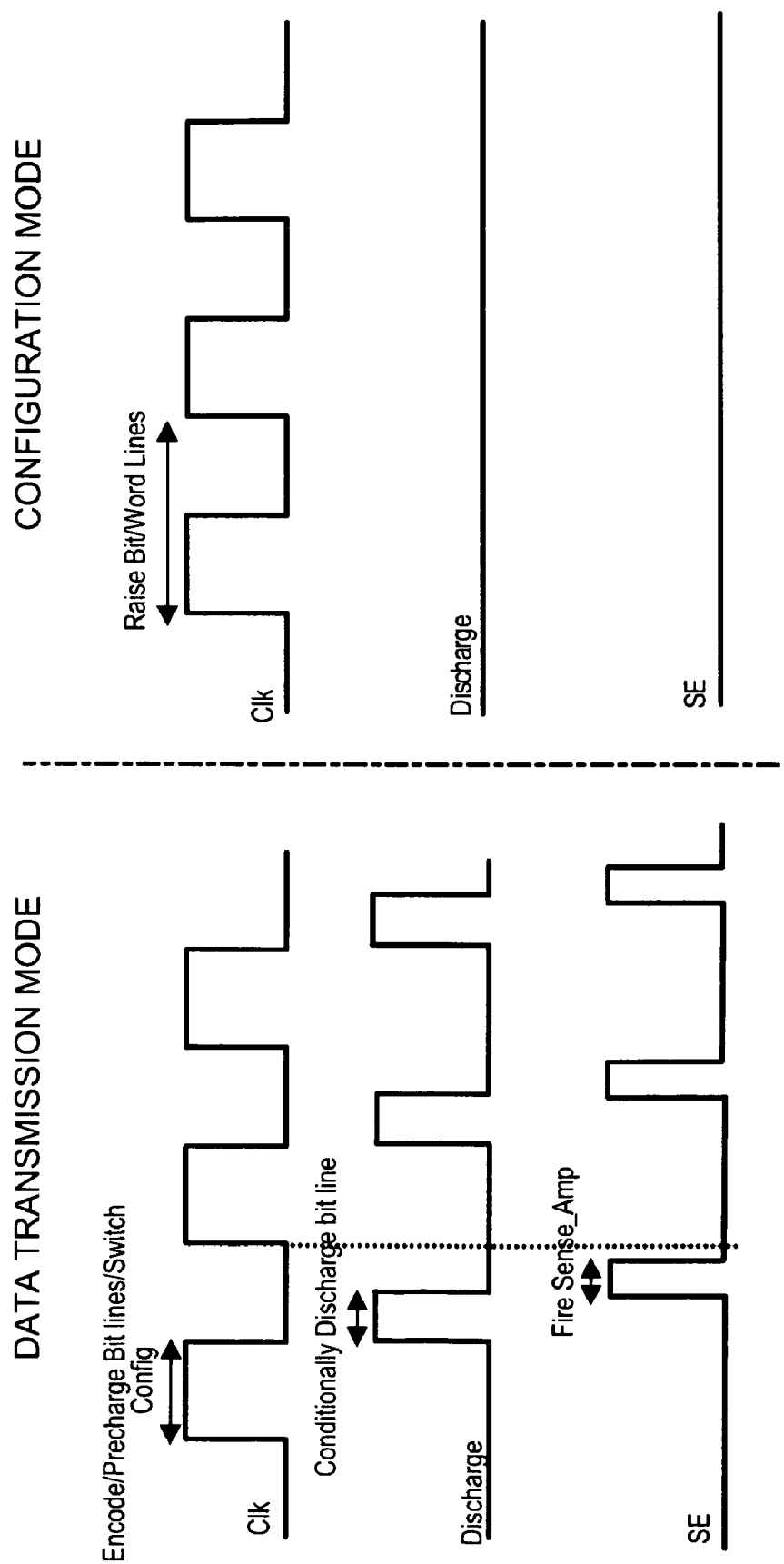
FIG. 8B illustrates the signals produced in both the data transmission mode of operation and the configuration mode of operation.

FIG. 8A shows pulse generation circuitry provided within the controller 40 to generate two signals referred to as "discharge" and "SE". Typically one instance of this pulse generation circuitry will be provided for the entire crossbar. The pulse generator circuitry consists of a plurality of transistors 510, 515, 535, 540 and a number of inverters 500, 505, 520, 525, 530, 545, 550 used as delay elements. The form of the discharge and SE signals produced from the clock signal using the pulse generation circuitry of FIG. 8A is shown in FIG. 8B for both the data transmission mode and the configuration mode. Whilst the discharge signal is high, the data lines are conditionally discharged dependent on the routing value stored in the storage element and the value of the data input lines. Following a slight delay, the SE signal is then set high to activate the sense amplifiers 60 to detect the voltage on the data output lines.

By sizing the components 500, 505, the length of time for which the discharge signal stays high can be tuned. Similarly, by sizing the components 525, 530, the length of time for which the SE signal stays high can be tuned.

In the configuration mode of operation, both the discharge and SE signals are kept at a logic zero level. This is achieved by the controller 40 blocking the clock signal to the pulse generation circuitry, instead the controller providing a logic zero value in place of the clock signal input to the pulse generation circuitry, thereby causing the discharge and SE signals to stay at a logic zero level as shown on the right hand side of FIG. 8B.

Figure 9A:
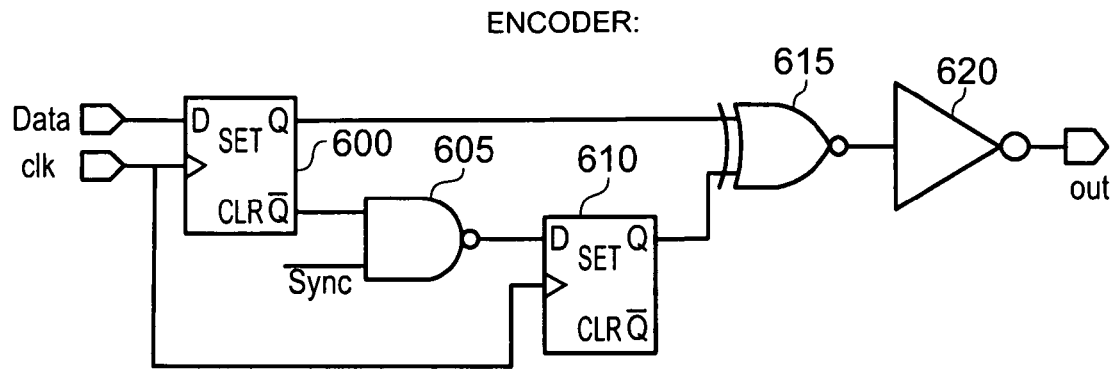
FIGS. 9A to 9E illustrate encoding and decoding circuitry that may be used in one embodiment of the present invention to encode the input data prior to input into the crossbar circuitry, and to decode the output data from the crossbar circuitry, in order to reduce power consumption within the crossbar circuitry.
Figure 9B:
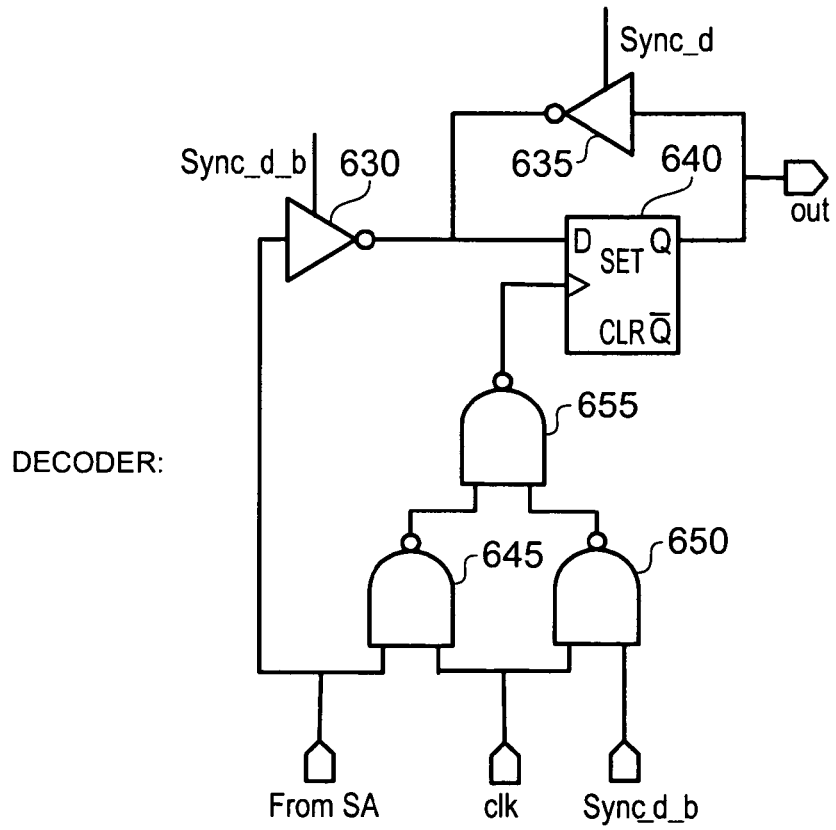
Figure 9C:
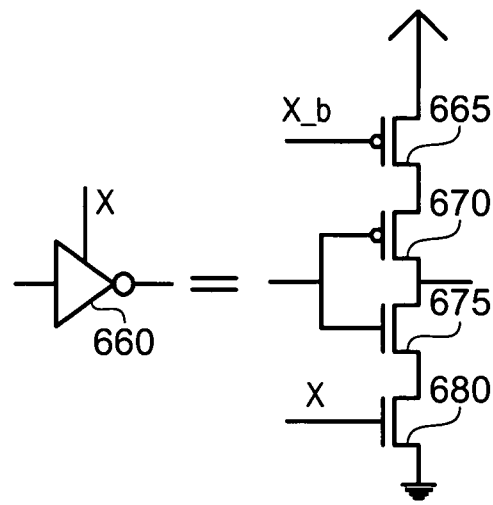

Since the output data lines are precharged high in the above described embodiment of the present invention, a static high input would result in those data lines being discharged every clock cycle. FIGS. 9A to 9E illustrate an encoding scheme that can be used to mitigate this, and thereby reduce power consumption. In particular, FIG. 9A shows encoder circuitry that may be placed between the source and the input data path of the crossbar, and FIG. 9B illustrates associated decoder circuitry that may be placed between the output of the sense amplifiers 60 and the destination circuit. Considering first the encoder circuitry of FIG. 9A, each item of new data is latched in the flip-flop 600 and the old data is propagated via the NAND gate 605 to the flip-flop 610. The comparator 615 then compares the new data with the old data and whenever there is a difference this causes a logic zero value to be output to the inverter 620 resulting in a logic one value being output by the encoder circuitry. Hence, from the provided input data, the encoder produces logic zero values separated by logic one values every time the input data changes from a logic zero to a logic one value or from a logic one value to a logic zero value. From the earlier discussion of the crossbar cells, it will be appreciated that the data output lines will only be discharged when such logic one values appear, thereby significantly reducing the power consumption associated with the precharge operation.

When the first data item is input, there will be no previous data to compare against, and accordingly the sync signal is used to set an initial state in the flip-flop 610. Further, the synchronisation pulse can be used to reset the encoder hardware (without the expense of a clock cycle) every time the crossbar switches to a new configuration, as for example may occur regularly when using crossbar cell structures such as those discussed earlier with reference to FIG. 6.

The corresponding decoder circuitry is illustrated in FIG. 9B. The structure of the components 630 and 635 is illustrated schematically in FIG. 9C by the component 660. As shown, such a component actually consists of a series of transistors 665, 670, 675, 680 connected in series.

The sync_d signal is the same as the sync signal, but delayed by one clock cycle. The sync_d_b signal is the inverted sync_d signal. The relationship between these three signals is shown in FIG. 9E. It should be noted that the sync signal is an active low signal and hence under normal operation (when the circuitry is not switching to a new configuration), sync and sync_d will be at a high, logic one, level, whilst the sync_d_b signal will be a low, logic zero, level.

As can be seen from FIG. 9B, the decoder receives the output from the sense amplifier, the clock signal and the sync_d_b signal and, via a series of NAND gates 645, 650, 655, provides an internal clock signal to the flip-flop 640. The output from the flip-flop 640 drives the output to the destination circuit, and recreates the original input data from the encoded output received via the sense amplifier.

In normal operation, since the sync signal will be at a logic 1 level and the sync_d_b signal will be a logic 0 level, component 635 will be activated while component 630 is deactivated. The three NAND gates 645, 650, 655 provide a pulse to Flip-Flop 640 when the sense amplifier detects a transition and sends a high signal. When a switch to a new configuration takes place, the sync and sync_d signals go low while the sync_d_b signal goes high. Hence, at that time, component 630 is activated while component 635 is deactivated. As a result, instead of toggling the previous data via the inverter 635, the flip-flop 640 takes the data (after component 630 inverts it) from the sense-amplifier.

Figure 9D:
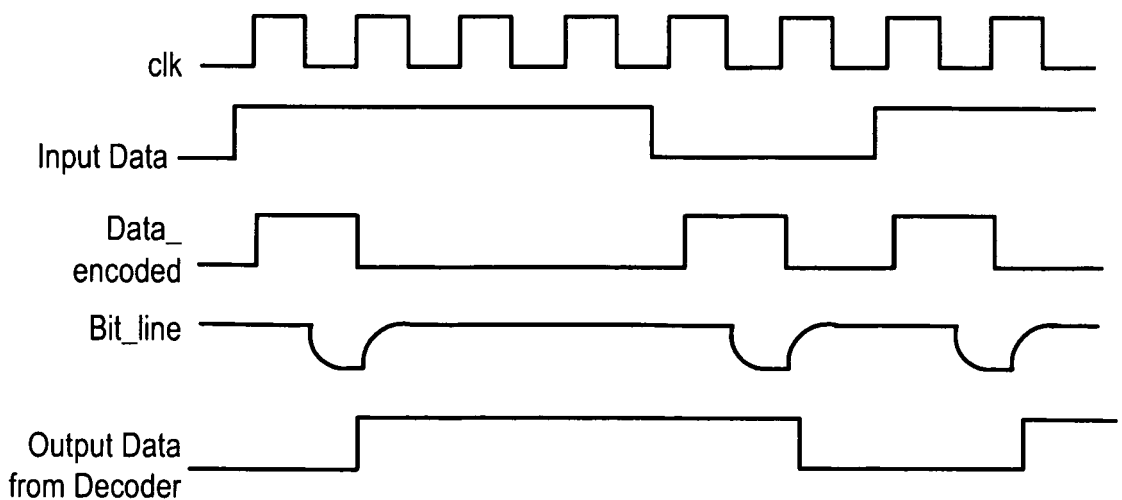
Figure 9E:
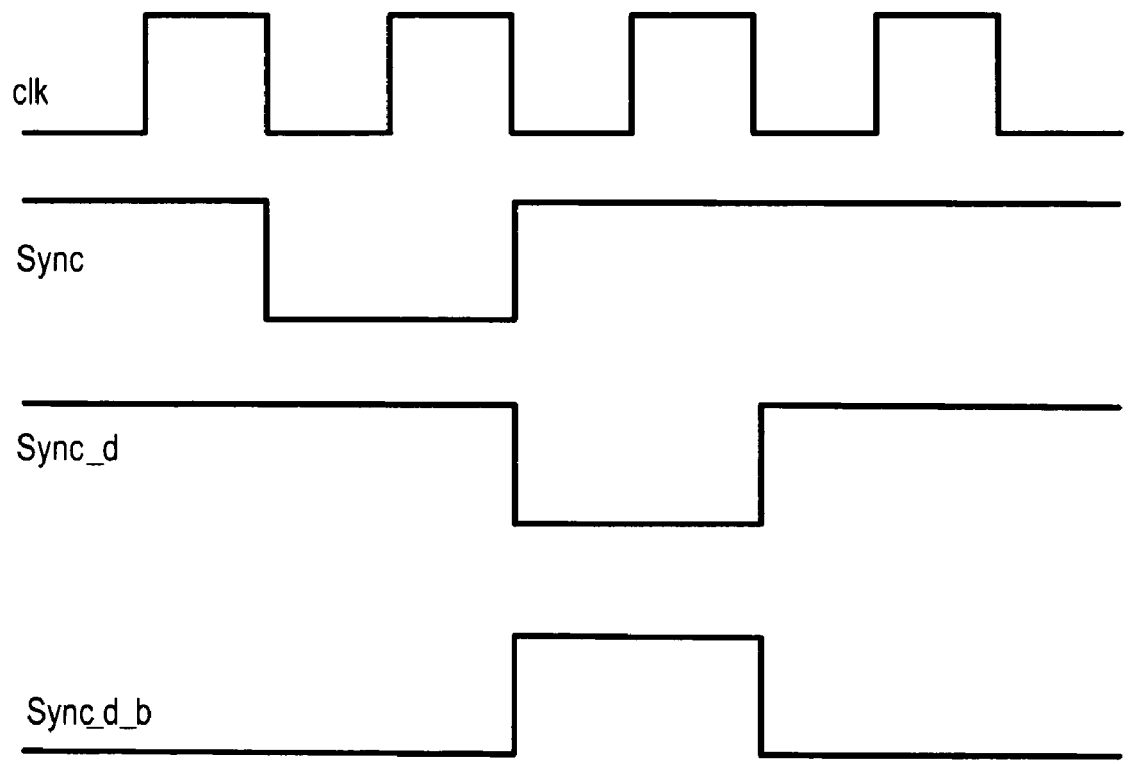

FIG. 9D illustrates the input data to the encoder circuitry, the resultant encoded data output from the encoder circuitry, an indication of the corresponding bit line being discharged each time the encoded data goes high, and shows the output data produced by the decoder circuitry based on the information received from the sense amp. It can be seen that the output data faithfully reproduces the input data that was passed to the encoder.

Figure 10:
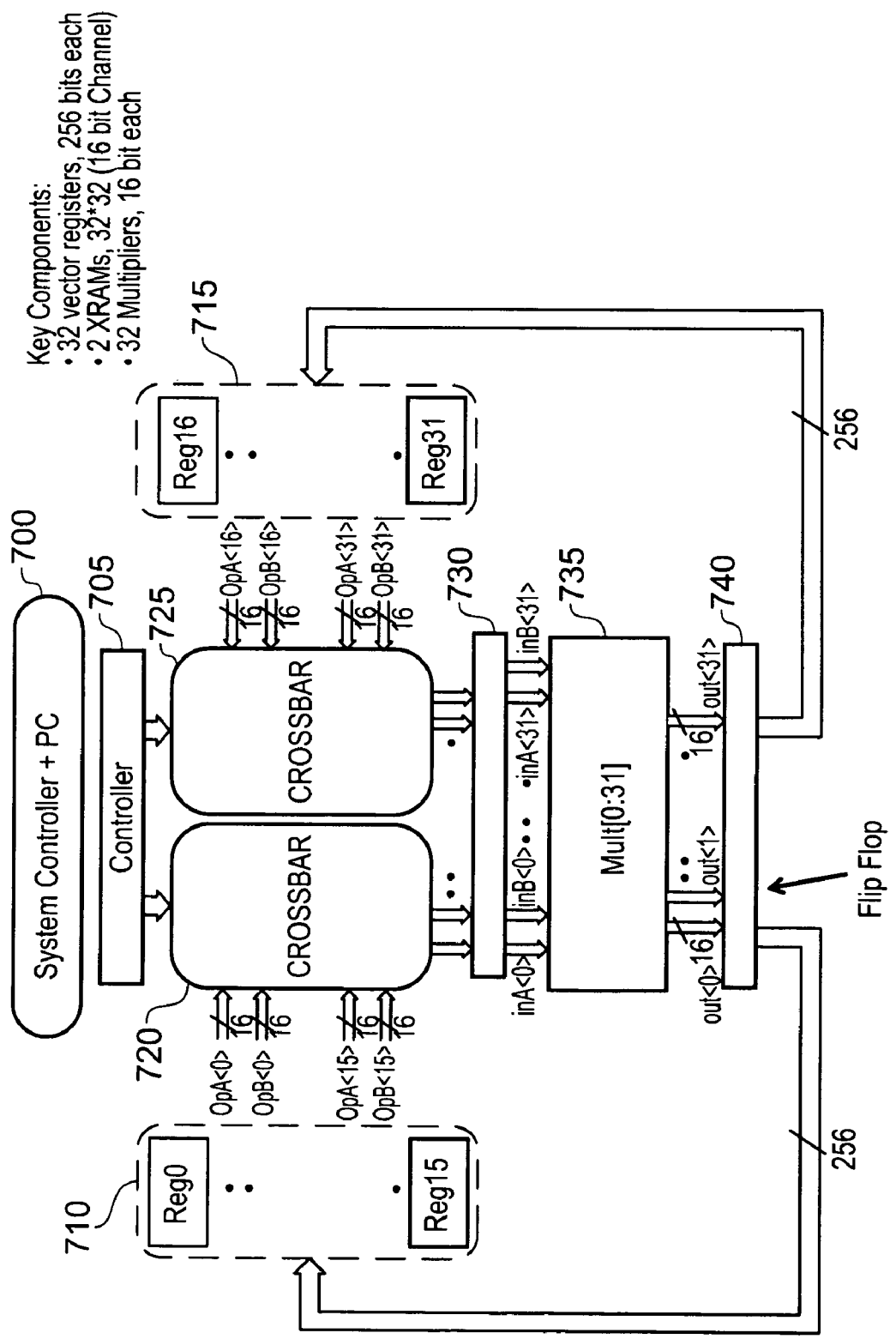
FIG. 10 illustrates an example apparatus in which the crossbar circuitry of embodiments of the present invention may be employed.

FIG. 10 illustrates one example implementation of the crossbar circuitry of embodiments of the present invention. In particular, two such crossbar circuits 720, 725 are shown, which are controlled by a single controller block 705. The crossbar circuit 720 is used to produce a first operand (opA) to be provided to a plurality of multiplier circuits 735, whilst the crossbar circuit 725 is arranged to provide a second operand (opB) to those multiplier circuits. Two register banks 710, 715, each containing 16 vector registers storing 256 bits of data, are provided. Together, these collectively form a system which can be considered to have 16 vector registers storing 512 bits of data each. This enables half of opA to be provided by register bank 710 and the other half of opA to be provided by register bank 715. Similarly, this enables half of opB to be provided by register bank 710 and the other half of opB to be provided by register bank 715.

The set of flip-flops 730 is used to latch the outputs from the crossbar circuits 720, 725, whereafter they are provided to the 32 multiplier circuits 735, with the results then being stored in a further set of flip-flops 740. Thereafter, the results are fed back to the register banks 710, 715, respectively.

Hence, in this embodiment there are 32 vector registers, each storing 256 bits of data, and two crossbar circuits each providing a 32×32 bit array with the data input paths and data output paths forming 16 bit channels. The multiplier circuitry 735 provides 32 multipliers each operating on 16 bit operands.

A system controller 700 is provided for managing the overall operation of the system, and will maintain a program counter (PC) value identifying the next instruction to be executed.

Accordingly, during the positive phase of a first cycle, the required registers are read and the data lines in the crossbars are precharged. In the negative phase of the first cycle, a conditional discharge of the data output lines occurs, and the sense amplifiers perform their sensing operation. Thereafter, in a second cycle, the multiplier circuitry performs the required multiplication operation, and then in a third cycle a write back operation occurs from the flip-flops 740 to the register banks 710, 715.

Figure 11:
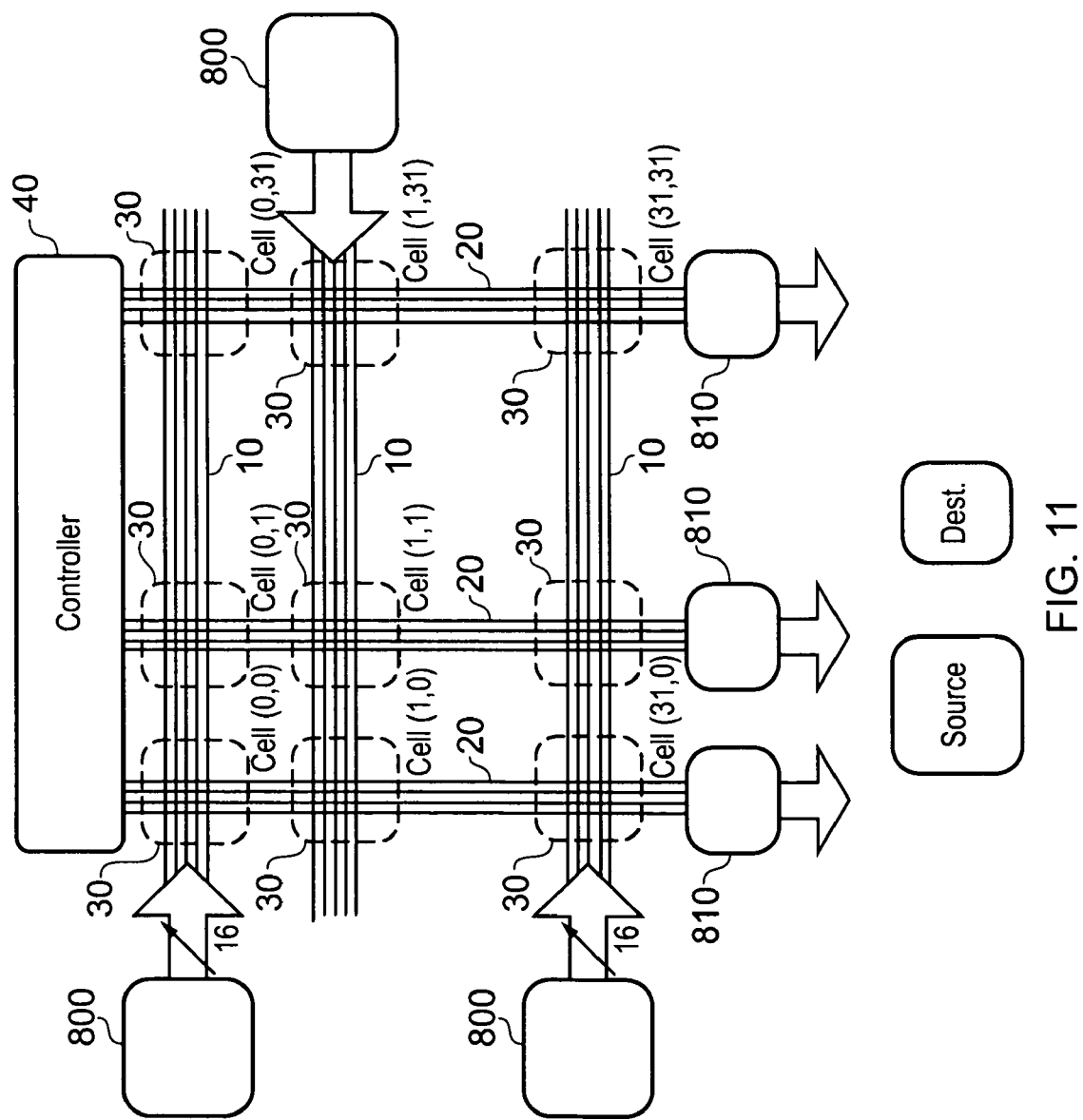
FIG. 11 is a diagram illustrating the crossbar circuitry in accordance with one embodiment of the present invention.

FIG. 11 illustrates the flexibility of layout that can occur when using crossbar circuitry in accordance with embodiments of the present invention. The design of the crossbar circuitry of embodiments of the present invention is very regular and delay across all channels is uniform. The source devices 800 providing the inputs to the input data paths can be provided at either side of the crossbar circuitry, and similarly, the destination circuits can be provided at either end of the data output paths. Whilst in FIG. 11, all of the destination circuits 810 are shown at the bottom end of the crossbar, one or more of them may also be provided at the upper end of the crossbar, even though the controller 40 is located at that upper end. This simplifies design floor-planning by reducing routing congestion.

Figure 12A:
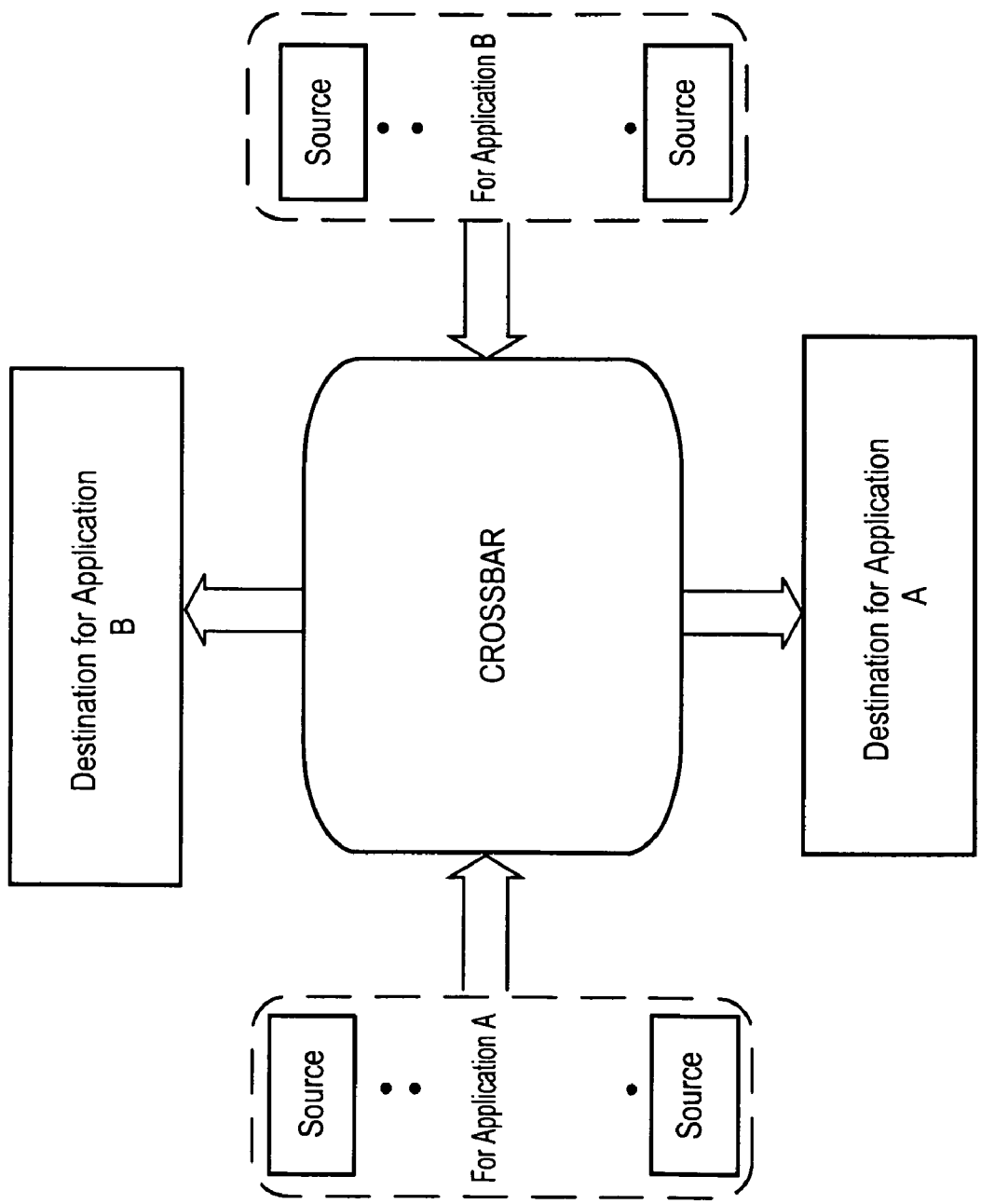
FIGS. 12A and 12B illustrate the use of crossbar circuitry of embodiments of the present invention in a duplex configuration
Figure 12B:
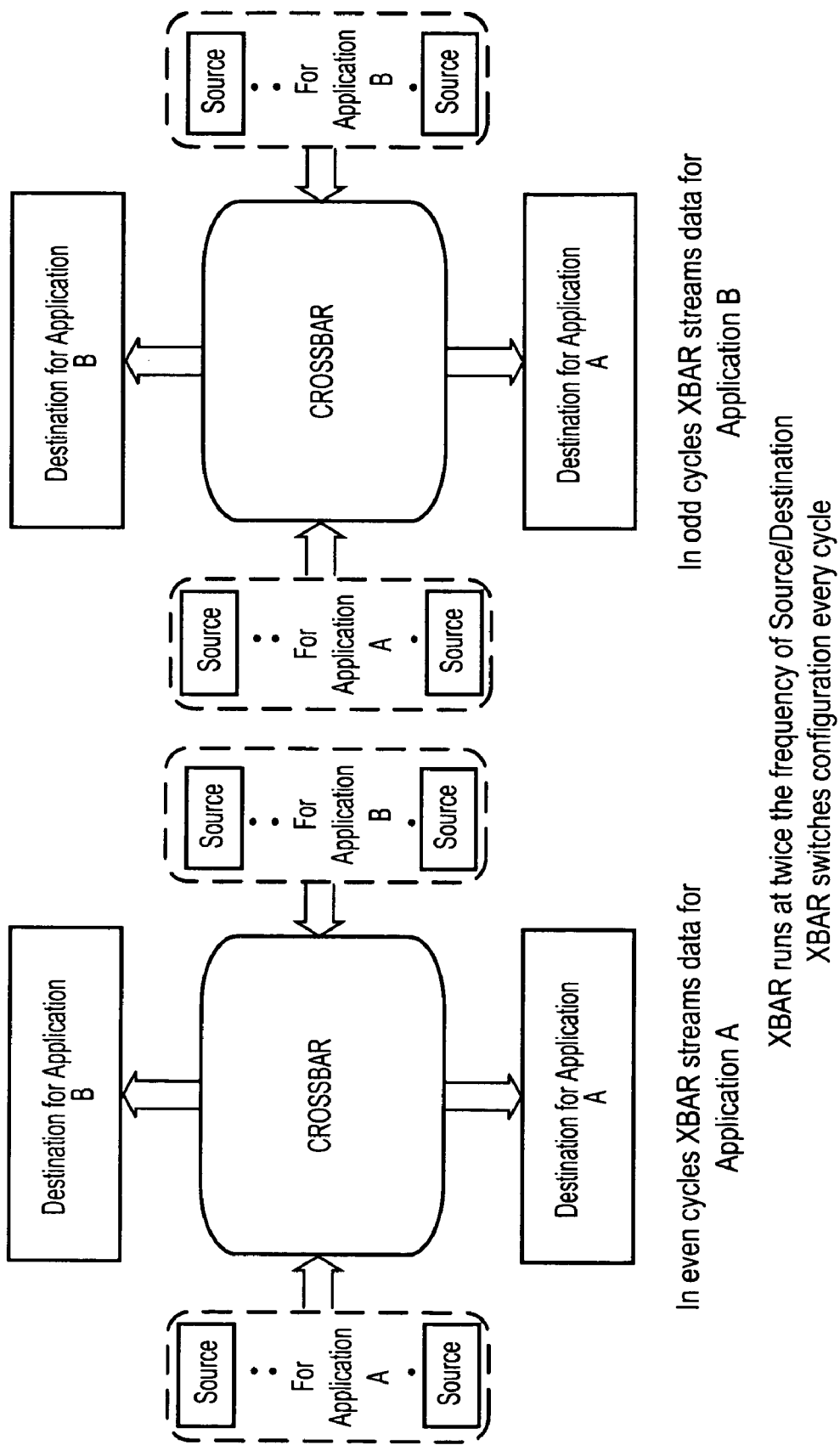

Hence, it will be appreciated that the crossbar circuitry of embodiments of the present invention offers the flexibility of placing sources at either horizontal ends and destinations at either vertical ends. In addition, as discussed earlier, it can store multiple configurations and switch between them seamlessly without incurring any delay penalty. By exploiting these two features, a single crossbar circuit can be used to handle two sets of sources and destinations, as illustrated schematically in FIGS. 12A and 12B. In state 1 the sources at the left communicate with the destinations at the bottom while the sources at the right stay in a tri-state mode. In state 2, the sources at the right communicate with the destinations at the top while the sources at the left stay tri-stated. The same input and output buses are used in both of the states, but use alternative configurations. The crossbar, being very fast, can be clocked at twice the frequency of the processing units (destinations).

From the above description of embodiments of the present invention, it will be seen that such embodiments provide a novel crossbar implementation scheme that can be used to design very large crossbars, such as may be required for multi-core applications. The crossbar circuitry of embodiments of the present invention re-uses the data output lines during the configuration mode of operation to program storage elements within each crossbar cell. The proposed implementation of embodiments of the present invention uses the minimum possible area to design the crossbar. As opposed to typical prior art implementations, where both the number of cross-points as well as the logic embedded at each cross-point grows, in accordance with embodiments of the present invention only the number of cross-points grows.

In addition, when employing the crossbar cell structure of embodiments of the present invention, neither the size of the transmission circuitry, nor the driver circuitry used to provide the input data on each input data path, need to increase in size as the crossbar circuitry increases in size. Further, no additional hardware or sizing is required to support multi-casting, where a single input data value is broadcast to multiple output paths.

Further, due to the regular structure employed in embodiments of the present invention, routing becomes significantly more straightforward than in typical prior art approaches.

Furthermore, in embodiments where multiple configurations are stored in the storage circuitry, this can boost the run time of applications that require complicated shuffle operations by reducing the number of memory accesses.

In one embodiment of the present invention, inputs are fed into the crossbar as buses and not as packets comprising the same bits from different buses, as for example would be required in a typical prior art crossbar employing multiplexing techniques. This makes the crossbar circuitry of embodiments of the present invention easy to utilise as a wide bus interconnect.

Due to the design of the crossbar circuitry of embodiments of the present invention, the delay through the crossbar grows linearly with size. This makes the crossbar circuitry of embodiments of the present invention readily usable for very large crossbars, such as 128×128 or 256×256 input/output crossbars.

As mentioned earlier, the design is very regular and the delay across all channels is uniform. Further, inputs can be fed from either horizontal end and outputs are available at either vertical end. This makes design floor planning easy by reducing routing congestion.

Although a particular embodiment of the invention has been described herein, it will be apparent that the invention is not limited thereto, and that many modifications and additions may be made within the scope of the invention. For example, various combinations of the features of the following dependent claims could be made with the features of the independent claims without departing from the scope of the present invention.

We claim:

1. Crossbar circuitry for interconnecting a plurality of source circuits and a plurality of destination circuits such that data input to the crossbar circuitry from any of said plurality of source circuits can be output to any of said plurality of destination circuits, the crossbar circuitry comprising:
   a plurality of data input paths passing through said crossbar circuitry, each data input path being connectable to one of said plurality of source circuits;
   a plurality of data output paths passing through said crossbar circuitry transverse to the plurality of data input paths, each data output path being connectable to one of said plurality of destination circuits;
   a crossbar cell associated with each intersection between one of said data input paths and one of said data output paths, each crossbar cell comprising:
      storage circuitry programmable to store a routing value, the routing value being programmed to a first value to indicate that data input along the data input path to the associated intersection is to be output on the data output path at the associated intersection, and the routing value being programmed to a second value to indicate that data input along the data input path to the associated intersection is not to be output on the data output path at the associated intersection; and
      transmission circuitry operable in a transmission mode of operation to be responsive to the routing value having said first value to detect the data input along the data input path and to output an indication of that data on the data output path at the associated intersection; and
   control circuitry for issuing control signals to the crossbar cells, during a configuration mode of operation the control circuitry re-utilising at least one of the data output paths to program the storage circuitry of one or more of the crossbar cells.

2. Crossbar circuitry as claimed in claim 1, wherein:
   each said data output path comprises n data output lines for carrying an n-bit data value during said transmission mode of operation; and
   during the configuration mode of operation, the control circuitry being configured to program at the same time the storage circuitry of up to n crossbar cells associated with a selected data output path by using the n data output lines of that data output path.

3. Crossbar circuitry as claimed in claim 2, further comprising:
   at least one word line routed to each storage circuitry for use in programming said storage circuitry during the configuration mode of operation;
   during the configuration mode of operation the control circuitry re-utilising the n data output lines of said selected data output path as n bit lines, each of said n bit lines being routed to a different one of n crossbar cells associated with said selected data output path to enable programming of said storage circuitry of said up to n crossbar cells.

4. Crossbar circuitry as claimed in claim 3, wherein:
   the number of crossbar cells associated with said selected data output path is mn, where m is an integer of 2 or more;
   said at least one word line comprises a plurality of word lines, each word line being connected to a different n crossbar cells associated with said selected data output path;
   during the configuration mode of operation, said number of crossbar cells are programmed via m consecutive programming operations, during each programming operation the n data output lines acting as said n bit lines for the n crossbar cells being programmed by that programming operation.

5. Crossbar circuitry as claimed in claim 3, wherein during the configuration mode of operation the at least one word line is driven by the control circuitry at a first logic level, and the routing value programmed into each storage circuitry is dependent on whether the associated output line acting as said bit line is driven by the control circuitry at the first logic level or a second logic level.

6. Crossbar circuitry as claimed in claim 5, wherein in the transmission mode of operation the word line is at a second logic level.

7. Crossbar circuitry as claimed in claim 3 wherein said at least one word line comprises a plurality of word lines, thereby enabling certain crossbar cells to be in said configuration mode of operation whilst other crossbar cells are in said transmission mode of operation.

8. Crossbar circuitry as claimed in claim 1, wherein said storage circuitry comprises a plurality of storage elements, each being arranged to store a routing value for one of a plurality of configurations of the crossbar circuitry.

9. Crossbar circuitry as claimed in claim 8, where each programming operation of the control circuitry during the configuration mode of operation causes a selected one of the storage elements to be programmed.

10. Crossbar circuitry as claimed in claim 8, wherein during the transmission mode of operation the control circuitry is configured to generate a configuration control signal to identify, for each crossbar cell, which storage element of the storage circuitry is to be used to provide the routing value to the transmission circuitry.

11. Crossbar circuitry as claimed in claim 10, wherein the control circuitry issues said configuration control signal for each said data output path, whereby each configuration control signal controls the configuration of each crossbar cell associated with one said data output path.

12. Crossbar circuitry as claimed in claim 1, wherein each data output path associated with a crossbar cell in the transmission mode of operation is precharged to a first logic level prior to data transfer, the transmission circuitry of each crossbar cell comprising:

first and second switches connected in series between the data output path and a second logic level;

in the transmission mode of operation the first switch being open or closed dependent on the routing value stored in the associated storage circuitry, and the second switch being open or closed dependent on the data input over the data input path.

13. Crossbar circuitry as claimed in claim 12, wherein each said data input path comprises n data input lines for carrying an n-bit input data value during the transmission mode of operation, and each said data output path comprises n data output lines for carrying an n-bit data value during said transmission mode of operation, at least the second switch being replicated for each output data line.

14. Crossbar circuitry as claimed in claim 12, wherein in the transmission mode of operation the data output path is pulled to the second logic level if the routing value is said first value and said data input value is at said first logic level.

15. Crossbar circuitry as claimed in claim 14, wherein each crossbar cell further comprises conditional discharge circuitry for turning off the first switch irrespective of the routing value whilst the associated data output path is being precharged to the first logic level, and for allowing the first switch to be controlled by the routing value following the precharging of the associated data output path to the first logic level.

16. Crossbar circuitry as claimed in claim 15, wherein the conditional discharge circuitry is incorporated within the storage circuitry of each crossbar cell.

17. Crossbar circuitry as claimed in claim 14, further comprising:

sense amplifier circuitry to detect, during the transmission mode of operation, the data output on the data output path, thereby allowing detection of a transition towards the second logic level before the data output path has reached the second logic level.

18. Crossbar circuitry as claimed in claim 14, further comprising:

encode circuitry between each of said plurality of source circuits and said plurality of data input paths;

decode circuitry between each of said plurality of data output paths and said plurality of destination circuits;

the encode circuitry applying an encoding operation to encode input data provided by each source circuit into an encoded format that reduces the number of times the data output paths need to be pulled to the second logic level following their precharge to the first logic level, when compared to the number of times the data output paths would need to be pulled to the second logic level if the original input data were passed through the crossbar circuitry;

the decode circuitry applying a corresponding decoding operation to identify the original input data provided by the source circuit from the encoded data output over the data output path.

19. Crossbar circuitry as claimed in claim 1, wherein each storage circuitry comprises at least one SRAM memory cell for storing said routing value.

20. Crossbar circuitry as claimed in claim 19, wherein each SRAM memory cell is a 6T SRAM memory cell.

21. Crossbar circuitry as claimed in claim 1, wherein said plurality of source circuits are connectable to either end of said plurality of data input paths.

22. Crossbar circuitry as claimed in claim 1, wherein said plurality of destination circuits are connectable to either end of said plurality of data output paths.

23. Crossbar circuitry as claimed in claim 8, wherein:

said plurality of source circuits are connected to a first end of said plurality of data input paths and an additional plurality of source circuits are connected to a second end of said plurality of data input paths;

said plurality of destination circuits are connected to a first end of said plurality of data output paths and an additional plurality of destination circuits are connected to a second end of said plurality of data output paths;

in a first state of the crossbar circuitry said plurality of source circuits being coupled to said plurality of destination circuits in accordance with a first of said plurality of configurations; and in a second state of the crossbar circuitry said additional plurality of source circuits being coupled to said additional plurality of destination circuits in accordance with a second of said plurality of configurations.

24. Crossbar circuitry as claimed in claim 23, wherein the crossbar circuitry is clocked at a frequency at least twice that of said source and destination circuits and said additional source and additional destination circuits.

25. A data processing apparatus comprising:

a plurality of registers for storing data values;

a plurality of processing circuits for performing data processing operations in parallel on multiple of the data values stored in said plurality of registers; and crossbar circuitry as claimed in claim 1 for routing the data value from any register of said plurality of registers to any processing circuit of said plurality of processing circuits.

26. Crossbar circuitry for interconnecting a plurality of source means and a plurality of destination means such that data input to the crossbar circuitry from any of said plurality of source means can be output to any of said plurality of destination means, the crossbar circuitry comprising:

a plurality of data input path means passing through said crossbar circuitry, each data input path means for connecting to one of said plurality of source means;

a plurality of data output path means passing through said crossbar circuitry transverse to the plurality of data input path means, each data output path means for connecting to one of said plurality of destination means;

a crossbar cell means associated with each intersection between one of said data input path means and one of said data output path means, each crossbar cell means comprising:

storage means programmable for storing a routing value, the routing value being programmed to a first value to indicate that data input along the data input path means to the associated intersection is to be output on the data output path means at the associated intersection, and the routing value being programmed to a second value to indicate that data input along the data input path means to the associated intersection is not to be output on the data output path means at the associated intersection; and transmission means, responsive to the routing value having said first value in a transmission mode of operation, for detecting the data input along the data input path means and for outputting an indication of that data on the data output path means at the associated intersection; and control means for issuing control signals to each crossbar cell means, during a configuration mode of operation the control means for re-utilising at least one of the data output path means to program the storage means of one or more of the crossbar cell means.

27. A method of operating crossbar circuitry to interconnect a plurality of source circuits and a plurality of destination circuits such that data input to the crossbar circuitry from any of said plurality of source circuits can be output to any of said plurality of destination circuits, the crossbar circuitry having a plurality of data input paths passing through said crossbar circuitry, each data input path being connectable to one of said plurality of source circuits, and a plurality of data output paths passing through said crossbar circuitry transverse to the plurality of data input paths, each data output path being connectable to one of said plurality of destination circuits, the method comprising:

employing a crossbar cell in association with each intersection between one of said data input paths and one of said data output paths;

programming a routing value in each crossbar cell, the routing value being programmed to a first value to indicate that data input along the data input path to the associated intersection is to be output on the data output path at the associated intersection, and the routing value being programmed to a second value to indicate that data input along the data input path to the associated intersection is not to be output on the data output path at the associated intersection;

in a transmission mode of operation, causing the crossbar cell to be responsive to the routing value having said first value to detect the data input along the data input path and to output an indication of that data on the data output path at the associated intersection; and issuing control signals to the crossbar cells, during a configuration mode of operation the control circuitry re-utilising at least one of the data output paths to program the storage circuitry of one or more of the crossbar cells.

* * * * *